US008254714B2

(12) United States Patent
Pauca et al.

(10) Patent No.: US 8,254,714 B2
(45) Date of Patent: Aug. 28, 2012

(54) METHODS AND SYSTEMS FOR DESIGNING ELECTROMAGNETIC WAVE FILTERS AND ELECTROMAGNETIC WAVE FILTERS DESIGNED USING SAME

(75) Inventors: Pau'l Pauca, Winston-Salem, NC (US); Sudhakar Prasad, Albuquerque, NM (US); Todd Torgersen, Pfafftown, NC (US); Robert J. Plemmons, Winston-Salem, NC (US)

(73) Assignee: Wake Forest University, Winston-Salem, NC (US)

( * ) Notice: Subject to any disclaimer, the term of this patent is extended or adjusted under 35 U.S.C. 154(b) by 2323 days.

(21) Appl. No.: 10/943,092

(22) Filed: Sep. 16, 2004

(65) Prior Publication Data

US 2005/0204329 A1 Sep. 15, 2005

Related U.S. Application Data

(60) Provisional application No. 60/503,536, filed on Sep. 16, 2003.

(51) Int. Cl.
*G06K 9/00* (2006.01)
(52) U.S. Cl. ....................................... 382/260
(58) Field of Classification Search .......... 382/254, 382/255, 260–263, 265, 275
See application file for complete search history.

(56) References Cited

U.S. PATENT DOCUMENTS

| 4,987,607 | A  | * | 1/1991  | Gilbreath et al. | 398/119 |
| 5,748,371 | A  | * | 5/1998  | Cathey et al.    | 359/558 |
| 5,756,981 | A  | * | 5/1998  | Roustaei et al.  | 235/462.42 |
| 6,097,856 | A  | * | 8/2000  | Hammond, Jr.     | 382/312 |
| 6,229,649 | B1 | * | 5/2001  | Woods et al.     | 359/560 |
| 6,511,180 | B2 | * | 1/2003  | Guirao et al.    | 351/211 |
| 6,547,139 | B1 | * | 4/2003  | Havens et al.    | 235/454 |
| 6,842,297 | B2 | * | 1/2005  | Dowski, Jr.      | 359/724 |
| 6,873,733 | B2 | * | 3/2005  | Dowski, Jr.      | 382/232 |
| 6,927,922 | B2 | * | 8/2005  | George et al.    | 359/708 |
| 6,984,206 | B2 | * | 1/2006  | Kumei et al.     | 600/176 |
| 7,115,849 | B2 | * | 10/2006 | Dowski et al.    | 250/201.9 |
| 7,180,673 | B2 | * | 2/2007  | Dowski, Jr.      | 359/637 |
| 7,209,293 | B2 | * | 4/2007  | Gaida et al.     | 359/656 |
| 7,218,448 | B1 | * | 5/2007  | Cathey et al.    | 359/558 |

(Continued)

FOREIGN PATENT DOCUMENTS

WO WO 9957599 A1 * 11/1999

(Continued)

OTHER PUBLICATIONS

Russ, John C., "The Image Processing Handbook," 2002, CRC Press, Fourth Edition, pp. 322-324.*

(Continued)

*Primary Examiner* — Vikkram Bali
(74) *Attorney, Agent, or Firm* — Jenkins, Wilson, Taylor & Hunt, P.A.

(57) ABSTRACT

Methods and systems for designing electromagnetic wave filters and electromagnetic wave filters designed using the methods and systems are disclosed. In one method, functions are selected whose linear combination define the surface of a filter for producing a desired phase-encoded image. Free parameter values are selected for the function and are varied. The values of the free parameters are observed with regard to an optimization function. Final values of the free parameters are selected based on the optimization function having a specific value or range of values.

14 Claims, 31 Drawing Sheets
(1 of 31 Drawing Sheet(s) Filed in Color)

U.S. PATENT DOCUMENTS

| | | | |
|---|---|---|---|
| 7,260,251 B2 * | 8/2007 | Dowski et al. | 382/128 |
| 7,379,613 B2 * | 5/2008 | Dowski et al. | 382/255 |
| 7,450,745 B2 * | 11/2008 | Dowski et al. | 382/128 |
| 7,469,202 B2 * | 12/2008 | Dowski et al. | 703/13 |
| 7,550,701 B2 * | 6/2009 | Cathey et al. | 250/201.9 |
| 7,679,830 B2 * | 3/2010 | Dowski, Jr. | 359/637 |
| 2002/0118457 A1 * | 8/2002 | Dowski, Jr. | 359/558 |
| 2008/0107354 A1 * | 5/2008 | Dowski et al. | 382/279 |

FOREIGN PATENT DOCUMENTS

| | | | |
|---|---|---|---|
| WO | WO 02052331 A2 * | 7/2002 | |
| WO | WO 02057832 A2 * | 7/2002 | |
| WO | WO 03073153 A1 * | 9/2003 | |

OTHER PUBLICATIONS

J. van der Gracht, J. G. Nagy, V. Pauca, and R. J. Plemmons, "Iterative restoration of wavefront coded imagery for focus invariance," Nov. 5, 2001, in Integrated Computational Imaging Systems, OSA Technical Digest Series (Optical Society of America, 2001), paper ITuA1, pp. 2-4.*

J. Ojeda-Castañeda, L. R. Berriel-Valdos, and E. Montes, "Spatial filter for increasing the depth of focus," 1985, Optical Society of America, Optical Letters, vol. 10, Issue 11, pp. 520-522.*

Stossel et al., "Multiple-point Impulse Responses: Controlled Blurring and Recovery (Optics Comm. 121 (1995) 156)," Optics Communications, vol. 122, p. 1 (Jan. 1, 1996).

Stossel et al., "Multiple-point Impulse Responses: Controlled Blurring and Recovery," Optics Communications, vol. 121, pp. 156-165 (Dec. 1, 1995).

R. Plemmons et al., "Computational Imaging Systems for Iris Recognition", *Proc. SPIE 5559*, 2004.

Prasad et al., "High-Resolution Imaging Using Integrated Optical Systems", *Int. J. Imaging Systems Technology*, 14(2): 76-74, 2004.

S. Prasad et al., "Pupil-Phase Optimization for Extended-Focus, Aberration-Corrected Imaging Systems", *SPIE Symp. Advanced Signal Processing: Algorithms, Architectures, and Implementations IX*, 2004.

J. Van Der Gracht et al., "Iris Recognition with Enhanced Depth-of-Field Image Acquisition", *Proc. SPIE 5358*, 2004.

Kubala et al., "Reducing Complexity in Computational Imaging Systems", *Optics Express*, 11: 2102-2108, 2003.

Pauca et al., "Integrated Optical-Digital Approaches for Enhancing Image Restoration and Focus Invariance", *Proc. SPIE 5205*, 348-357, 2003.

S. Prasad et al., "Engineering the Pupil Phase to Improve Image Quality", *Proceedings of the SPIE*, 5108: 1-12, 2003.

S. Prasad et al., "Integrated Optics Systems for Image Quality Control", *Proc. 2002 AMOS Technical Conference*, 2002.

Van Der Gracht et al., "Iterative Restoration of Wavefront Coded Imagery for Focus Invariance", *OSA Trends in Optics and Photonics (TOPS)*, OSA Technical Digest, 2001.

Bradburn et al., "Realizations of Focus Invariance in Optical-Digital Systems with Wavefront Coding", *Applied Optics*, 26: 9157-9166, 1997.

Nagy et al., "Space-varying Restoration of Optical Images", *J. Optical Soc. Amer. A.*, 14: 3162-3174, 1997.

Dowski et al., "Extended Depth of Field Through Wavefront Coding", *Applied Optics*, 34: 1859-1866, 1995.

* cited by examiner

METHODS AND SYSTEMS FOR DESIGNING ELECTROMAGNETIC WAVE FILTERS AND ELECTROMAGNETIC WAVE FILTERS DESIGNED USING SAME

RELATED APPLICATIONS

This application claims the benefit of U.S. Provisional Patent Application Ser. No. 60/503,536, filed Sep. 16, 2003, the disclosure of which is incorporated herein by reference in its entirety.

GOVERNMENT INTEREST

This invention was made with Government support under Grant Nos. F49620-01-1-0321 and F49620-02-1-0107 awarded by the Air Force Office of Scientific Research (AFOSR) and DAAD19-00-1-0540 awarded by the Army Research Office (ARO). The U.S. Government has certain rights in the invention.

TECHNICAL FIELD

The present invention relates to methods and systems for designing electromagnetic wave filters. More particularly, the present invention relates to methods and systems for designing electromagnetic wave filters that alter the phase of electromagnetic waves being collected by an image acquisition system so that an original image can be restored using standard restoration algorithms.

BACKGROUND ART

In image acquisition systems, desired system performance can be achieved by optimizing one or more design parameters. One particular parameter that it may be desirable to optimize in some image acquisition systems is depth of focus. The depth of focus of an image acquisition system is the range of distances in object space in which objects are considered to be in focus. In some image acquisition systems, such as those used for surveillance and biometric identification, it is important that the image acquisition system be capable of producing clear images of objects located at different distances from the image plane. However, conventional image acquisition systems have limited depth of focus. As a result, only objects at a fixed predetermined distance from the lens will appear in focus.

One method improving the depth of focus is to reduce the size of the lens aperture. However, reducing the lens aperture size reduces flux collected by the imaging system and increases distortion in the final image caused by diffraction.

Another method for improving depth of focus of the image acquisition system is to provide a lens that moves relative to the image plane and thereby mechanically increases the depth of focus. However, mechanically focusing an image acquisition system using moving parts may be undesirable in surveillance systems because the motion or the sound made by the moving parts may be detected by the party under surveillance. In addition, the mechanical parts used to move the lens and/or the image plane are subject to wear and may increase the overall cost of the image acquisition system. Another problem with image acquisition systems that use moving parts to focus on objects at different distances is that they are incapable of simultaneously capturing in-focus images of objects at different distances from the lens.

In light of the difficulties associated with conventional image acquisition systems, wavefront encoding methods have been developed to reduce the spatially varying blur in an acquired image caused by objects being located at different depths. Current wavefront encoding methods involve placing a cubic phase mask in front of the lens to alter the phase of incident light based a weighting factor and the cube of the x and y coordinates of each point. The mathematical expression for the phase variation produced by one common cubic mask is as follows:

$$\Phi(x,y)=a(x^3+y^3), \qquad (1)$$

where $\Phi(x,y)$ is the amount of phase variation applied by the cubic mask to each point (x,y) in the point in the image plane, x and y are the Cartesian coordinates of each point in the image plane, with (0,0) being the center of the image plane, and a is the weighting factor or strength of the mask.

FIG. 1A illustrates image blurring caused by an optical system with limited depth of focus. In FIG. 1A, the objects being imaged are two children's toys, Sylvester® the Cat and a dog, located at different focal distances. Because the optical system has limited depth of focus, the image of Sylvester® appears in focus, and the image of the dog appears out of focus. FIG. 1B is an intermediate image illustrating the results of applying a cubic mask to the same scene. In FIG. 1B, the images of the dog and Sylvester® are blurred equally. Spatially invariant blurring allows restoration by applying a common restoration algorithm to all pixels in the intermediate image. FIG. 1C illustrates the results of applying the restoration algorithm to the blurred image of FIG. 1B. In FIG. 1C, the images of the dog and Sylvester® are both in focus. Thus, from FIGS. 1A-1C, a cubic mask is capable of improving the depth of focus of an image acquisition system.

While cubic masks reduce the spatial variance in defocus caused by objects being located at different distances, simulations have shown that cubic masks can produce artifacts in the restored images, such as stripe patterns or bright streaks, which bear no resemblance to the true object being imaged. Another problem associated with cubic masks is that iterative optimization methods described herein have used cubic masks as a basis function and did not converge to the cubic mask as the optimal result. If the cubic mask were the optimal solution, the iterative optimization process would converge to the cubic mask as its solution. Thus, depending on the optimization method being used, cubic masks are not the optimal choice for phase encoding of an incident image so that an image of the original object can be produced from the phase-encoded image.

Yet another problem with phase encoding in general is that there has been no well-defined methodology for optimizing phase variation in the image plane using basis functions with multiple free parameters. For example, if a cubic phase mask is utilized, the only parameter to be selected is the weighting parameter a. Using a cubic phase mask with a single free parameter oversimplifies the filter design problem and can result in suboptimal phase masks.

Accordingly, in light of these difficulties associated with conventional phase masks and methods for designing such masks, there exists a long felt need for improved methods and systems for designing electromagnetic wave filters and for filters designed using the methods and systems.

DISCLOSURE OF THE INVENTION

Methods and systems for designing electromagnetic wave filters, also referred to as phase masks, result in a phase mask that produces a phase-encoded image capable of being restored into a viewable or machine-readable image according to user specifications. According to one method for designing a phase mask, the phase mask is characterized using a predetermined set of functions whose linear combination describes the shape of the phase mask. In one implementation, Zernike polynomials are used to characterize the shape of the phase mask. In an alternate implementation, symmetric polynomials are used to characterize the shape of the phase mask.

Once the polynomials have been selected, a plurality of free parameters associated with the set of functions is chosen. Values of the free parameters are varied and a relationship between the values of the free parameters and a predetermined optimization function are observed. In one implementation, the optimization function includes derivatives of the Strehl ratio with regard to a defocus parameter. In an alternate implementation, the optimization function is based on Fisher information. In yet another implementation, the optimization function is a min-max function. Based on the observations, sets of parameter values are chosen for the electromagnetic wave filter based on the optimization function having a predetermined value or range of values.

Once the parameter values for the optimization function have been selected, an electromagnetic wave filter whose surface corresponds to the set of functions with the selected parameter values can be produced. The electromagnetic wave filter can then be placed in an optical system and used to encode images and produce an intermediate image. If the parameter being optimized is depth of focus, the intermediate image will have nearly uniform blur or defocus across all points in the image plane. As a result, standard restoration algorithms can be used to restore the original image.

Because the electromagnetic wave filter design methods described herein use multiple free parameters in characterizing the filter shape, phase variation in the resulting image can be finely tuned according to user specifications.

The methods and systems described herein for designing electromagnetic wave filters can be implemented in hardware, software, firmware, or any combination thereof. Thus, a method for designing an electromagnetic wave filter may be implemented using computer executable instructions embodied in a computer-readable medium. Exemplary computer-readable media suitable for use with embodiments of the present invention include storage devices, such as disk storage devices and chip memory devices, as well as downloadable electrical signals.

Accordingly, it is an object of the invention to provide methods and systems for designing electromagnetic wave filters that minimize spatially varying blur in an intermediate image.

It is another object of the invention to provide a method for designing an electromagnetic wave filter that allows values of a plurality of free parameters to be varied in selecting the optimal filter design.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

The patent or application file contains at least one drawing executed in color. Copies of the patent with color drawings will be provided by the United States Patent and Trademark Office upon request and payment of the necessary fee.

DETAILED DESCRIPTION OF THE INVENTION

Figure 1A:
FIG. 1A is an image of two objects illustrating spatially varying defocus.
Figure 1B:
FIG. 1B is an image of the scene corresponding to FIG. 1A where a cubic mask has been applied to produce an intermediate image with uniform defocus.
Figure 1C:
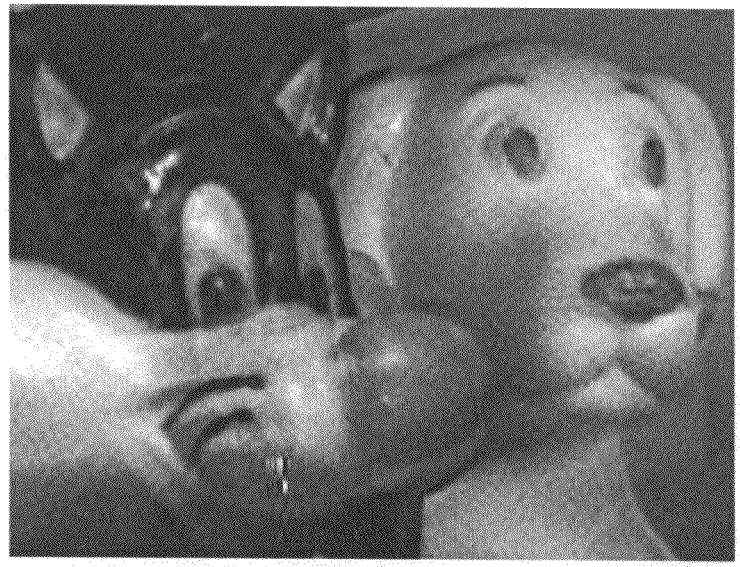
FIG. 1C is a restored image corresponding to the image of FIG. 1B.
Figure 2:
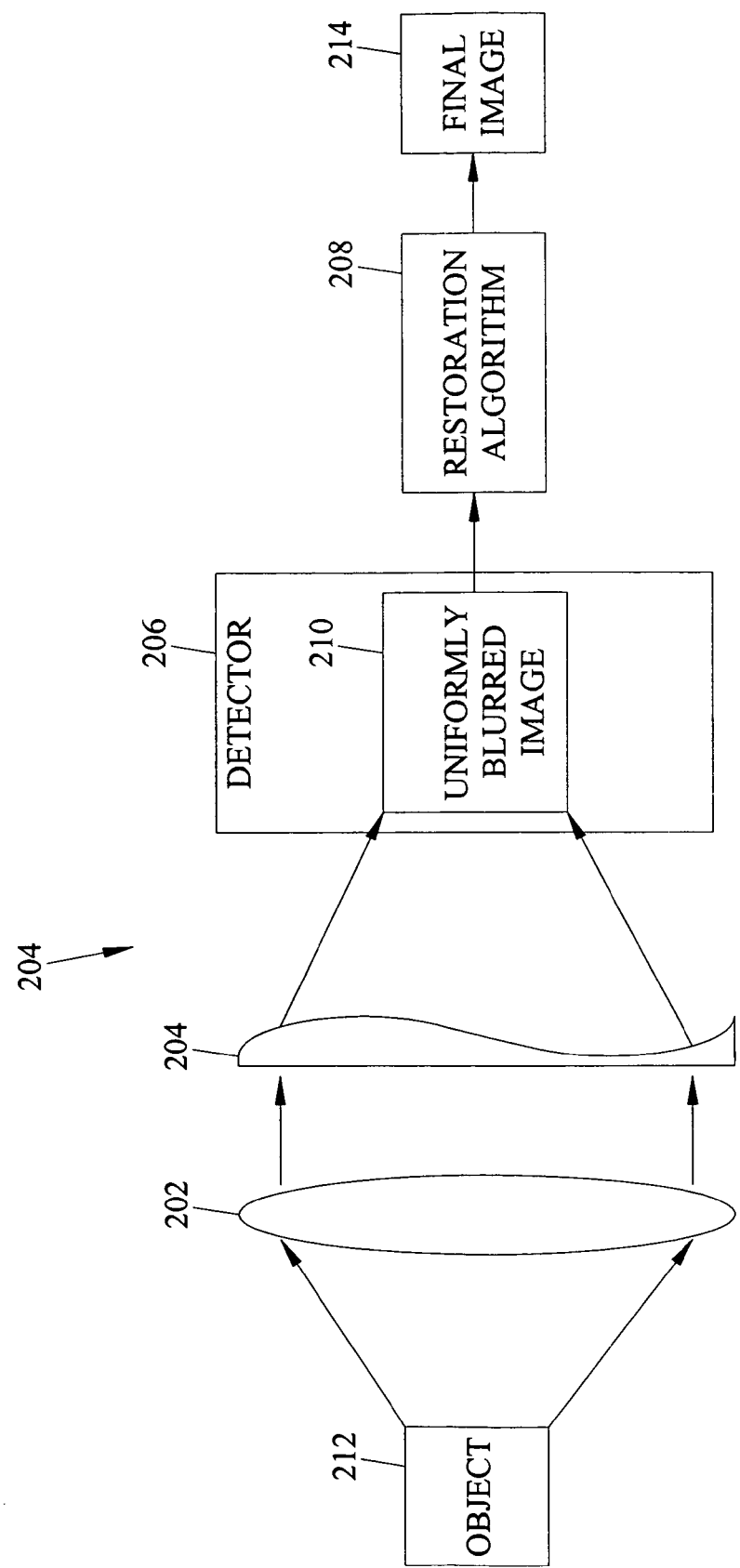
FIG. 2 is a schematic diagram of an image acquisition system in which a phase mask designed using the methods and systems of the present invention may be utilized.

As stated above, the present invention includes methods and systems for designing electromagnetic wave filters for image acquisition systems. FIG. 2 illustrates an exemplary image acquisition system in which electromagnetic wave filters designed using the methods and systems described herein may be utilized. Referring to FIG. 2, an image acquisition system 200 includes a lens 202, a phase mask 204, a detector 206, and a restoration algorithm 208. Lens 202 may be any suitable lens selected according to the type of image being acquired. Phase mask 204 may be designed using the methods and systems described herein using functions whose linear combination describes the shape of phase mask 204 and varying free parameter values such that an optimization function has a predetermined value. In one exemplary implementation where it is desirable to optimize depth of focus, phase mask 204 may be selected to reduce spatially varying defocus in blurred image 210 of object 212 such that restoration algorithm 208 can produce a final image 214 where objects at different distances appear in focus. Restoration algorithm 208 may be any suitable image restoration algorithm for producing a clear image from a uniformly blurred image. In one exemplary implementation, restoration algorithm 208 may include a Wiener filter.

Figure 3:
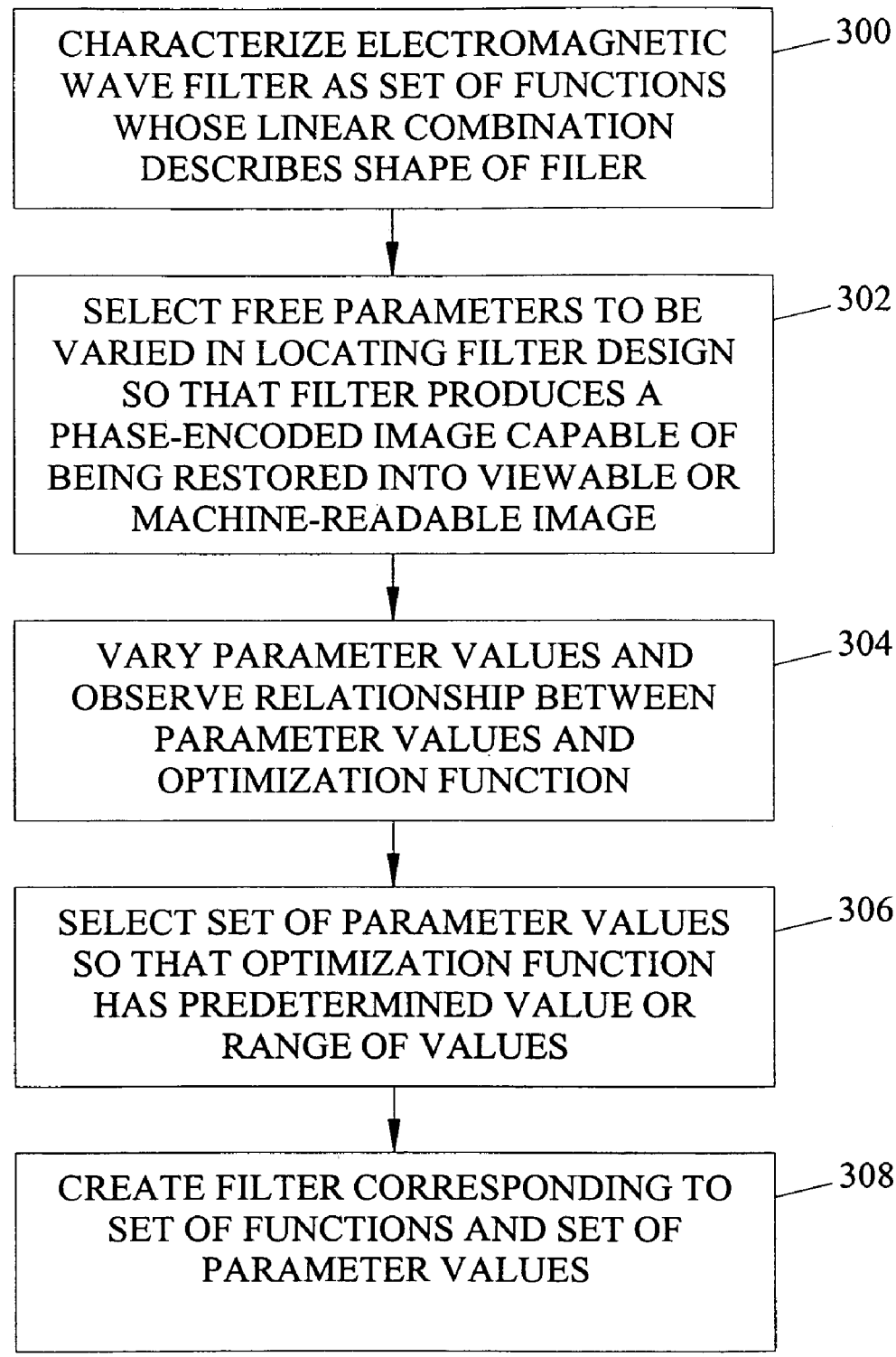
FIG. 3 is a flow chart illustrating exemplary steps for designing a phase mask or electromagnetic wave filter according to an embodiment of the present invention.

FIG. 3 is a flow chart illustrating exemplary overall steps for designing an electromagnetic wave filter according to an embodiment of the present invention. Referring to FIG. 3, in step 300, an electromagnetic wave filter is characterized as a set of functions whose linear combination describes the shape of the filter. In one exemplary implementation, the set of functions comprises Zernike polynomials. In another implementation, the set of functions comprises third and higher order symmetric polynomials. In step 302, free parameters or coefficients of the terms of the polynomials are selected in locating a filter design so that the filter produces a phase-encoded image capable of being restored into a viewable or machine-readable image.

In step 304, the parameter values are varied and a relationship between the parameter values and an optimization function is observed. In one exemplary implementation, the optimization function comprises derivatives of the Strehl ratio with regard to a defocus parameter. The Strehl ratio is defined as the ratio of on-access intensity given a particular phase mask characterized by the equations and a particular set of values for the free parameters and on-access intensity assuming a diffraction-limited image acquisition system. The rates of change of the Strehl ratio with regard to the defocus parameter (represented by first and higher-order derivatives of the Strehl ratio with regard to defocus) reflect how defocus changes for objects located at different depths. Thus, it is desirable to minimize these derivatives so that the intermediate image has reduced spatially varying defocus.

In addition to minimizing the derivatives of the Strehl ratio, it may be desirable to ensure that the Strehl ratio itself has at least a predetermined value, even when the derivatives are minimized, to ensure that there is sufficient information in the intermediate image to allow restoration of the final image. For example, gray clouds in the sky form a phase mask that produces an image with spatially invariant defocus. That is, if a manually focusing camera is used to obtain images of a gray sky with the focus adjustment on the camera set at different depths, the acquired image will be the same for all depths. Thus, a gray sky functions as a nearly perfect phase mask with regard to depth of focus. However, original information regarding images in the sky is lost. For example, an image of the sun or an airplane flying above the clouds is incapable of being restored in the final image, despite the spatially invariant depth of focus. In order to avoid this difficulty, a penalty function may be used to ensure that the Strehl ratio is at least a predetermined value. The penalty function and its relationship to the Strehl ratio will be described in detail below.

In an alternate implementation, the optimization function may be selected based on Fisher information. Like the Strehl-ratio-based methods, the methods that use Fisher information include measuring the sensitivity of the optimization function with regard to a defocus parameter. Penalty functions may also be used to ensure that sufficient information remains in the intermediate image to allow restoration of the final image.

In yet another implementation, a min-max function may be used as the optimization function. The min-max function has proved to be particularly useful in removing spherical aberrations from the final image. Methods for using the min-max function as the optimization function will be described in detail below.

Returning to FIG. 3, in step 306, a set of parameter values is selected so that the optimization function has a predetermined value or range of values. As discussed above, it may be desirable to select the parameter values such that the Strehl ratio, the derivatives of the Strehl ratio, the Fisher information, or the min-max function has a predetermined value or range of values. In step 308, a filter is created corresponding to the set of functions and the set of parameter values. Since the set of parameter values and the set of functions describe the desired phase variation, and phase variation corresponds to lens shape, phase masks can be created using standard optical element manufacturing techniques. In one implementation, the phase mask may be created using an electromagnetic-radiation-translucent material, such as glass, whose thickness corresponds to the desired phase variation. In an alternate implementation, a liquid crystal spatial light modulator can be used to generate the spatially varying index of refraction required for the phase mask. In yet another implementation, a deformed or deformable mirror may be used to create the desired spatial variations in the phase mask.

General Characterization of Imaging Systems

A well-designed incoherent imaging system can be treated as a linear shift-invariant system. The image plane intensity can be expressed in terms of a convolution given by $$I(x_i,y_i)=O(x_i,y_i)*h(x_i,y_i)+\eta(x_i,y_i), \quad (2)$$

where * denotes convolution, $I(x_i, y_i)$ represents the observed two-dimensional image intensity distribution, $O(x_i, y_i)$ the unknown true object intensity distribution, $h(x_i, y_i)$ the intensity point spread function (PSF), and $\eta(x_i, y_i)$ represents noise in the system. The point spread function represents the amount by which a photon from the object spreads out in the image. The PSF is governed by the aberrations, including defocus errors, and the geometry of the pupil aperture (V. N. Mahajan, *Optical Imaging and Aberrations, Part II: Wave Diffraction Optics*, SPIE Press, 2001). Letting H=F(h) denote the complex 2-D Fourier transform of the PSF $h=h(x_i, y_i)$, H can be written as $$H=|H|e^{i\psi} \quad (3)$$

Here H is the optical transfer function (OTF), its modulus |H| is the modulation transfer function (MTF) and $\psi$ is its phase. In order to make the final image insensitive to varying degrees of defocus, a phase mask must be selected such that the PSF and also the optical transfer function are the same for different points in the image, despite spatially varying defocus.

Strehl Ratio-Based Methods

As described above, one approach for extending the depth of field is based on managing the Strehl ratio as a function of the field defocus, accomplished by aberration balancing. The Strehl ratio (SR) is defined as the ratio of the on-axis intensity (generally, although not always, the peak intensity) with a nontrivial pupil phase and that without any pupil phase. As used herein, the term "pupil phase" refers to the phase variation introduced by the phase mask in the image plane (also referred to herein as the pupil plane). The pupil phase can be expressed as $\phi(\vec{p};\delta)\equiv(r,\theta;\delta)$, where $\delta$ represents the defocus parameter. By applying the Fresnel propagation formulas to the imaging problem of interest here, the Strehl ratio can be reduced to a ratio of pupil integrals in polar coordinates (V. N. Mahajan, *Optical Imaging and Aberrations, Part II: Wave Diffraction Optics*, SPIE Press, 2001), $$\chi(\delta) = \frac{\left|\int_0^{2\pi}\int_0^z P(r,\theta)\exp[i\phi(r,\theta;\delta)]rdrd\theta\right|^2}{\left|\int_0^{2\pi}\int_0^z P(r,\theta)rdrd\theta\right|^2} \quad (4)$$

where $P(r, \theta)$ is the pupil function that is 1 inside the pupil and 0 outside. The explicit use of cylindrical coordinates $r$, $\theta$ anticipates the nearly exclusive use of a circular pupil for which $P(r, \theta)=1$ for $r<z$ and 0 for $r>z$, z being the pupil radius. Without loss of generality, $z=1$ is used as the pupil radius in Equation (4). Also, since the denominator is the square of the pupil area, $\pi^2$, the Strehl ratio may be regarded as the squared modulus of the uniform pupil average of $\exp[i\phi(r,\theta;\delta)]$, which can be abbreviated as $$\chi(\delta)=|<\exp[i\phi(r,\theta;\delta)]>|^2 \quad (5)$$

with the triangular brackets denoting such an average.

Expressing the exponential in terms of trigonometric functions, the Strehl ratio can be rewritten as $$\chi(\delta)=C^2+S^2,\ C\equiv<\cos\phi(r,\theta;\delta)>\ \text{and}\ S\equiv<\sin\phi(r,\theta;\delta)>. \quad (6)$$

As described above, designing a filter according to the methods described herein involves selecting a set of functions whose linear combination described the shape of the filter. Since the shape of the filter corresponds to the desired phase variation in the pupil plane, the set of functions may be selected to describe the phase as a function of defocus and location in the pupil plane. In the material to follow a variety of parameterizations of the phase is considered. One parameterization uses Zernike polynomials (V. N. Mahajan, *Optical Imaging and Aberrations, Part II: Wave Diffraction Optics*, SPIE Press, 2001 and Roggeman et al., *Imaging Through Turbulence*, CRC Press, 1996), which describe departures from a constant pupil phase that would lead to perfect (diffraction-limited) imagery. These polynomials have interesting and useful properties: they form a complete set, they are readily separated into radial and angular functions, and the individual polynomials are orthogonal over the (entire) unit circle, see, e.g., (Roggeman et al., *Imaging Through Turbulence*, CRC Press, 1996). They can be used to build error or metric functions, and linear combinations of them can be used to specify aspheric surfaces for wavefront phase encoding in order to balance aberrations (B. Walker, *Optical Engineering Fundamentals*, SPIE Press, 1997).

The Zernike polynomials used herein for the defocus problem, as well as their corresponding aberration names, are listed here for completeness:

| | | (7) |
|---|---|---|
| $Z_4(r, \theta) = \sqrt{3}(2r^2 - 1)$ | defocus | |
| $Z_5(r, \theta) = \sqrt{6}r^2 \sin 2\theta$ | astigmatism, 45° | |
| $Z_6(r, \theta) = \sqrt{6}r^2 \cos 2\theta$ | astigmatism, 0° | |
| $Z_7(r, \theta) = \sqrt{8}(3r^3 - 2r) \sin \theta$ | coma, x-direction | |
| $Z_8(r, \theta) = \sqrt{8}(3r^3 - 2r) \cos \theta$ | coma, y-direction | |
| $Z_9(r, \theta) = \sqrt{8}r^3 \sin 3\theta$ | field curvature, 30° | |
| $Z_{10}(r, \theta) = \sqrt{8}r^3 \cos 3\theta$ | field curvature, 0° | |

The pupil-phase polynomial used herein includes a quadratic defocus term, represented by the Zernike polynomial $Z_4(r, \theta)$, and certain higher-order phase terms introduced deliberately via a phase mask. The effects of some specific forms of these additional phase terms on the defocus term, including the standard cubic phase mask given by Equation (1) are examined. For example, the choice of the weighting, or strength, parameter a in order to approximately maximize the resulting optical system Strehl ratio is examined. Extending this approach another step leads to a symmetric form of the mask, namely a simple symmetrical set involving two cubic polynomials, $$\phi s(r,\theta,\delta,a,b)=\delta Z_4(r;\theta)+a(x^3+y^3)+b(x^2y+xy^2), \quad (8)$$

where $x=r\cos\theta$ and $y=r\sin\theta$, and $\delta Z_4(r,\theta)$ is the same as $\delta r^2$ apart from an unimportant scaling factor and an additive phase term.

Alternatively, the phase can be parameterized by a collection of N higher-order Zernike polynomials, $$\phi z(r, \theta, \delta, \vec{u}) = \delta Z_4(r, \theta) + \sum_{i=5}^{N+4} u_i Z_i(r, \theta). \quad (9)$$

As described above, one step in designing a phase mask is selecting free parameter values to be varied. The set of coefficients $u_i$, $i=5, \ldots, N+4$, (or a, b for the symmetric form of the pupil-phase) are chosen to solve an optimization problem that guarantees that the phase-encoded, blurred image has minimum sensitivity to defocus errors, subject to certain sensitivity-related constraints.

In one exemplary implementation, the coefficient values can be selected by requiring that the Strehl ratio $\chi(\delta)$, when expanded in a power series in $\delta$, differs from its in-focus value $\chi(0)$ at most by terms of order $O(\delta^{N+1})$ and higher. By choosing N to be sufficiently large, $\chi(\delta)$, an important radiometric measure of image fidelity, can thus be rendered relatively insensitive to changes of defocus around its zero value. The depth of focus can be greatly increased in this way, the more so the larger the value of N.

To implement this method, the first N derivatives of $\chi(\delta)$ are set to 0 at $\delta=0$. For the symmetrical set of two cubic polynomials given by $\phi s$ in Equation (8), all odd order derivatives of the Strehl ratio $\chi(\delta)$ are identically zero at $\delta=0$, due to certain symmetry properties of the resulting integrals in Equation (4). This is not the case for $\phi z$, however. For the phase mask characterized by Equation (9) the second and fourth order derivatives are set to zero.

In general, the derivatives can be taken by means of the Leibnitz rule for arbitrary-order derivatives of a product of two functions. Use of Equation (6) leads to the following nth order derivative of $\chi(\delta)$ at $\delta=0$:

$$\left.\frac{\partial^n \chi}{\partial \delta^n}\right|_{\delta=0} = \sum_{k=0}^{n} \binom{n}{k}\left[C^{(k)}C^{(n-k)} + S^{(k)}S^{(n-k)}\right], \quad (10)$$

where a superscript (k) on a function of $\delta$ indicates its kth derivative evaluated at $\delta=0$, and $$\binom{n}{k}$$

is the usual binomial coefficient.

Because of the trigonometric forms of the functions C and S, the linearity of the phase in Equation (10) in its coefficients, and the commutativity of the differentiation and pupil averaging operators, the required derivatives of C and S can be expressed by the formulas $$C^{(2k)} = (-1)^k \langle Z_4^{2k}(r)\cos\phi(r;\theta,0,\vec{u})\rangle,$$

$$C^{(2k+1)} = (-1)^{k+1}\langle Z_4^{2k+1}(r)\sin\phi(r;\theta,0,\vec{u})\rangle,$$

$$S^{(2k)} = (-1)^k \langle Z_4^{2k}(r)\sin\phi(r;\theta,0,\vec{u})\rangle,$$

$$S^{(2k+1)} = (-1)^k \langle Z_4^{2k+1}(r)\cos\phi(r;\theta,0,\vec{u})\rangle. \quad (11)$$

A similar consideration applies when the symmetrical pupil phase in Equation (8) is used instead, the only difference being that no more than two derivatives of the SR are forced to 0 by properly choosing the two unknown parameters a, b. One may thus regard N as being equal to 2 in this case, without loss of generality.

Setting Equation (10) to 0 for $n=1, \ldots, N$, or $n=2$ and 4 for the case of Equation (8), which can be ignored at present for the sake of simplicity, results in the following N equations can be used to find the needed values of the N coefficients in $\vec{u}$:

$$F_n(\vec{u}) = \sum_{k=0}^{n}\binom{n}{k}\left[C^{(k)}C^{(n-k)} + S^{(k)}S^{(n-k)}\right] = 0, n = 1, \ldots, N. \quad (12)$$

Here $\vec{u}$ is the vector of unknown design parameters.

Before Equation (12) can be solved numerically, additional optimization criteria must be utilized to exclude trivial solutions. Without further constraints, the problem has multiple families of undesirable trivial solutions, namely those in which one or more of the design parameters are infinitely large. The vanishing SR that results from such coefficient values trivially has vanishing derivatives relative to the defocus parameter $\delta$ to all orders, but that is hardly of any physical interest.

In view of this difficulty, additional constraints can be imposed that tend to reject solutions that depress the SR to such small values that the blurred signal cannot be distinguished from noise. One approach is to minimize the norm squared of the vector expression $$F(\vec{u}) = [F_1(\vec{u}), F_2(\vec{u}), \ldots, F_N(\vec{u})], \quad (13)$$

plus a penalty term that constrains the parameter components $\vec{u}$ from becoming too large, and a second penalty term which constrains the Strehl ratio from becoming too small. A nonlinear optimization method can then be used to solve $$\min_{\vec{u}}\left\{\|F(\vec{u})\|^2 + \gamma J(\vec{u}) + J_\chi(\vec{u})\right\}. \quad (14)$$

Here $\gamma J(\vec{u})$ is a penalty term, weighted by the parameter $\gamma$. In solving Equation (14), different choices of $J(\vec{u})$ can be used, including $\|\vec{u}\|_2^2$. In one exemplary implementation $J(\vec{u})$ can be selected as $$J_\chi(\vec{u}) = M(1-\chi(0,\vec{u}))\left[1 - \frac{1}{1+e^{-c(\chi(0,\vec{u})\hat{x})}}\right], \quad (15)$$

where $\chi(0,\vec{u})$ is the Strehl ratio, M is a positive constant representing the maximum penalty, c is a large positive constant that determines the steepness of the "cutoff edge", and $\hat{x}$ represents the minimally acceptable Strehl ratio. The notation $\chi(0,\vec{u})$ is intended to emphasize the dependence of the Strehl ratio on $\vec{u}$ and to emphasize that the Strehl ratio (along with its partial derivatives) is evaluated at $\delta=0$.

The factor $$1 - \frac{1}{1 + e^{-c(\chi(0,\vec{u}) - \hat{\chi})}} \quad (16)$$

in Equation (15) is approximately 1 for $\chi(0,\vec{u}) < \hat{\chi}$, is equal to $$\frac{1}{2}$$

for $\chi(0,\vec{u}) = \hat{\chi}$, and is approximately 0 for $\chi(0,\vec{u}) > \hat{\chi}$. Thus, a rapidly increasing penalty is added as the Strehl ratio decreases below the minimally acceptable threshold, $\hat{\chi}$. The factor $(1-\chi(0,\vec{u}))$ is included to ensure that $J\chi(\vec{u})$ is approximately linear in $\chi(0,\vec{u})$ with slope equal to −M for values of $\chi(0,\vec{u})$ less than $\hat{\chi}$. This helps prevent the solver from becoming "stuck in a flat spot" when starting values correspond to $\chi(0,\vec{u}) < \hat{\chi}$. The objective function in Equation (14) is minimized in the space of the N unknown parameters by appropriate optimization routines described below.

Computer Modeling and Optical System Simulation

Figure 4A:
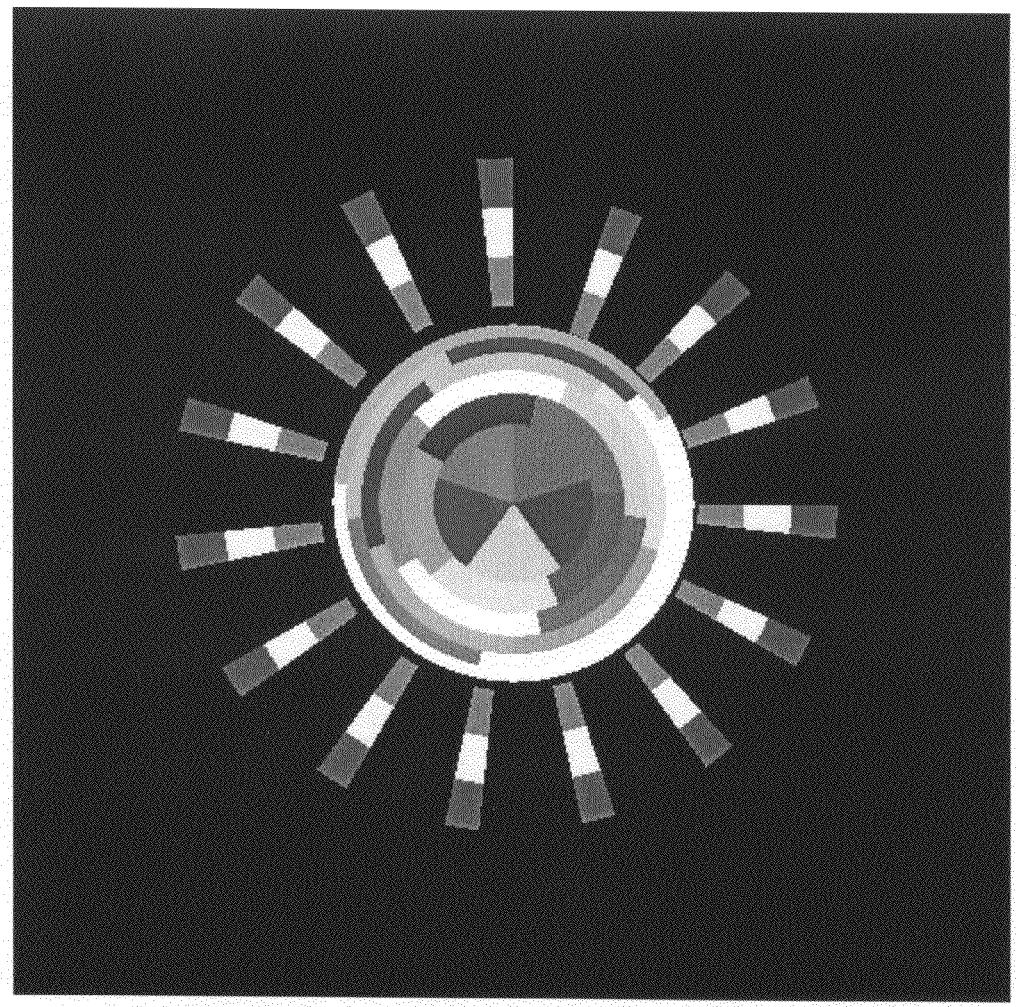
FIG. 4A is a simulated blur free perspective projection of a spiral with arms located at different distances from the image plane.

Filter designs numerically computer and described below are evaluated using computer simulation software. The simulator models a parabolic cone-shaped object surrounded by a set of wings arranged in a spiral at equal angles and linearly progressive distances away from a reference plane coincident with the center point. The central point is visually nearest to the observer, while the wings spiral away from the observer in the counter-clockwise direction. FIG. 4A illustrates the parabolic, cone-shaped object.

Figure 4B:
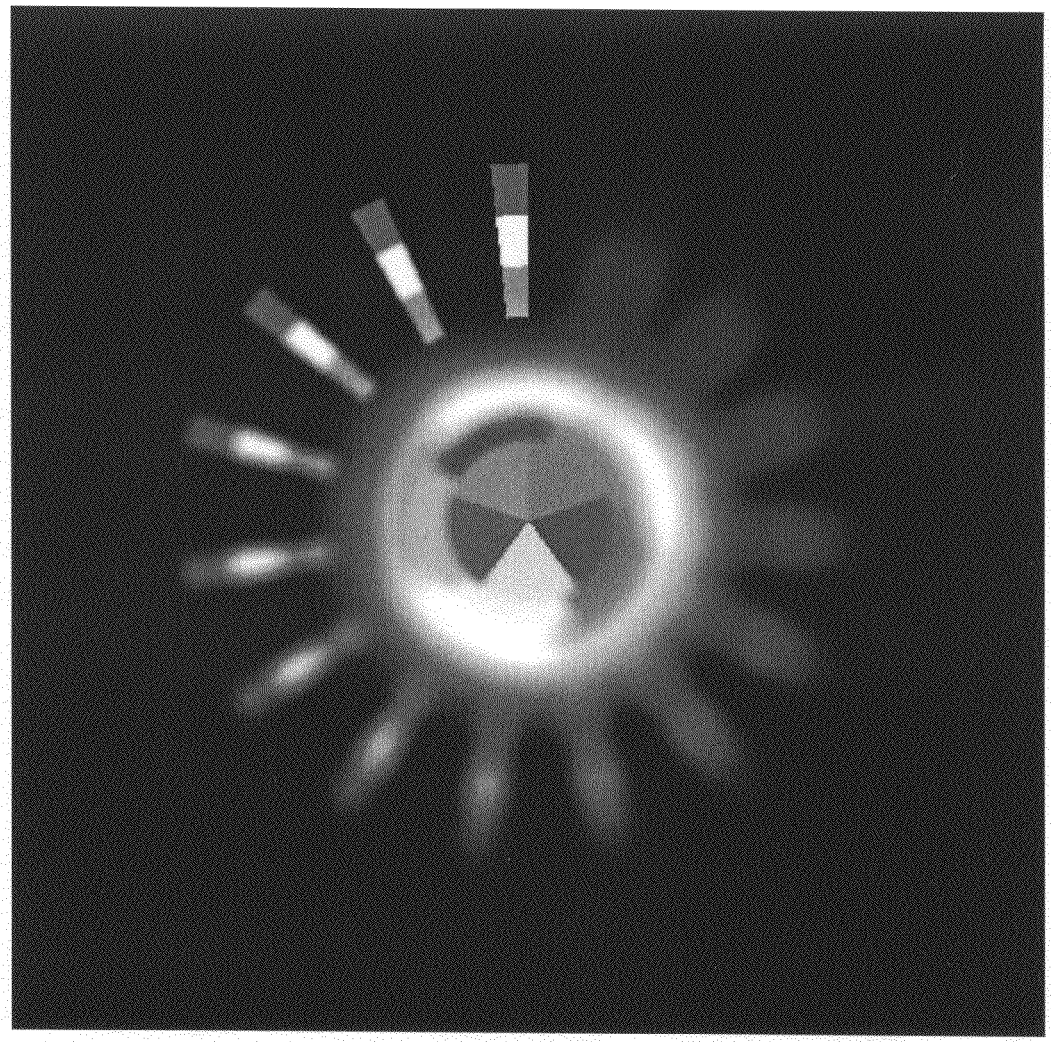
FIG. 4B is a simulated image of the spiral of FIG. 4A illustrating spatially varying defocus.

FIG. 4B is a model of an image of the object of FIG. 4A with spatially varying defocus. In FIG. 4B, each point in the object is blurred by a spatially varying PSF which models the appropriate defocus according to the distance from that point to the reference plane. For improved performance, the modeled object is decomposed into point sets that are equidistant from the reference plane. Fourier-transform-based convolution methods are applied to each point set. The simulated scattered light energy from each point set is then summed together to produce the final simulated image.

The electromagnetic wave filters described herein are simulated by adding a chosen fixed pupil phase function to the defocus phase at each point in the image. The result of adding the pupil phase function to the defocus phase at each point is an image with nearly spatially constant blur or defocus. Examples of images with spatially constant blur or defocus will be described in detail below.

Computing the Design Parameters

In the following two sections, the defocus aberration is balanced by using the phase representations given in Equations (8) and (9).

Design Parameters for the Symmetric Phase Mask

A pupil phase design with a single design parameter will first be explored, leading to the two-parameter representation given in Equation (8). The following representations will be considered for Equation (8):

$$\phi_c(\delta) = \delta Z_4(r;\theta) + a(x^3 + y^3) \quad (17)$$

$$\phi_d(\delta) = \delta Z_4(r;\theta) + b(x^2 y + y^2 x). \quad (18)$$

The numerical problem is to find a solution u to the nonlinear equation, $$F_2(u) = \left. \frac{\partial^2 \chi}{\partial \delta^2} \right|_{\delta=0} = 0, \quad (19)$$

that maximizes the Strehl ratio, where u is determined by the choice of pupil-phase representation $\phi_c$ or $\phi_d$. In Equation (17) the unknown parameter a corresponds to the strength of the standard cubic phase mask described above. In this example, the parameter a is selected by maximizing the Strehl ratio. In prior design methods that utilized cubic phase masks, information theory was used for choosing an appropriate value for the parameter a with regard to various noise levels. Equation (19) utilizes the second derivative of the Strehl ratio, since $$\left. \frac{\partial \chi}{\partial \delta} \right|_{\delta=0} = 0$$

for all values of the design parameter (a or b) in both cases corresponding to $\phi_c$ or $\phi_d$.

Figure 5A:
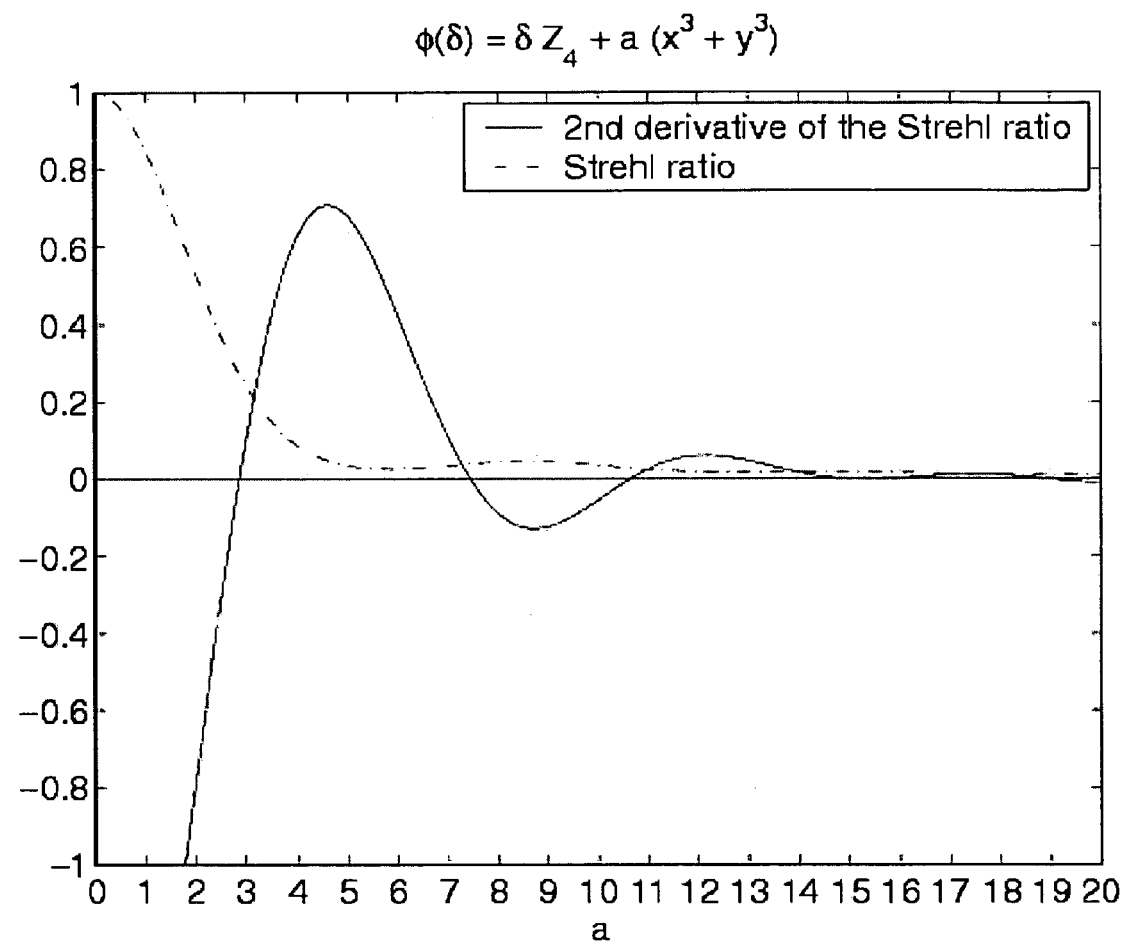
FIG. 5A is a graph illustrating the Strehl ratio and the second derivative of the Strehl ratio given different values of a free parameter for a phase mask designed using the methods and systems of the present invention.
Figure 5B:
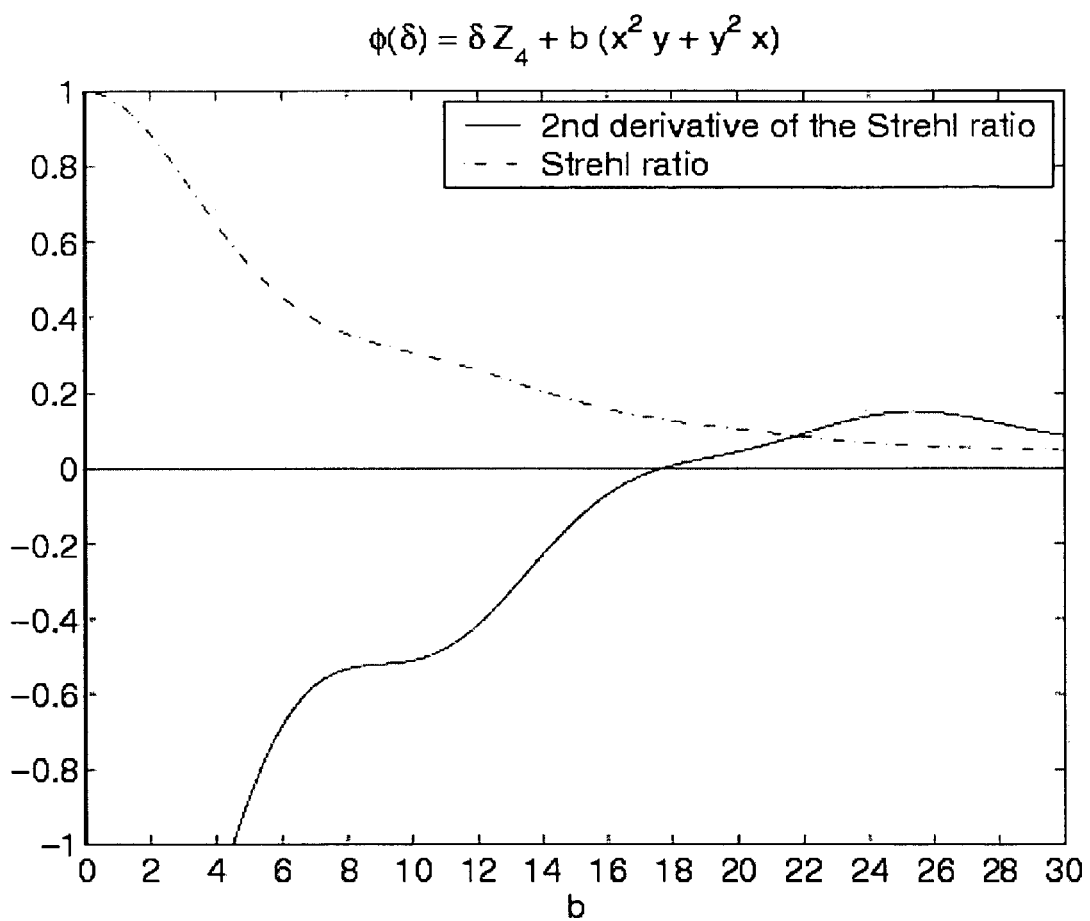
FIG. 5B is a graph of the Strehl ratio and the second derivative of the Strehl ratio given different values of another parameter of phase mask designed using the methods and systems of the present invention.

FIGS. 5A and 5B are graphs of $F_2(u)$ and the Strehl ratio, $\chi$, as functions of the unknown variables u=a and u=b. $F_2(u)$ for both choices of the pupil-phase is an even function and hence symmetric about the y axis. While the first roots of $F_2(u)=0$ maximize the Strehl ratio (a≈2.85, and b≈17.65), these values produce filters that are highly sensitive to defocus. Van der Gracht and Ellis, in "Information optimized extended depth-of-field through wavefront coding," *Applied Optics*, Vol. 34, pp. 1859-1866, 1995, use an information theoretic approach to show that insensitivity to defocus increases with the magnitude of u. There is a tradeoff therefore in optimizing the Strehl ratio (leading to better restorations) while at the same time optimizing the optical system's insensitivity to defocus.

It can also be observed empirically from FIGS. 5A and 5B that $F_2(u)$ approaches zero as the magnitude of u increases. In particular, solutions to the problem can be taken as values of u which are not necessarily at the roots but large enough so that $F_2(u) \approx 0$. For example for the cubic representation given in Equation (17) a value of a=20 results in $|F_2(a)| \approx 0.01$ with an acceptable Strehl ratio of 0.012.

The two-parameter pupil-phase design problem using $\phi$s as given in Equation (8) will now be considered. In solving the equation, the second and fourth derivatives of the Strehl ratio, $\chi$, were considered, since the odd derivatives are zero for arbitrary a and b. The numerical problem is to find a solution u=(a, b) to the nonlinear system, $$F_2(a,b)=0, \; F_4(a,b)=0 \quad (20)$$

Figure 6A:
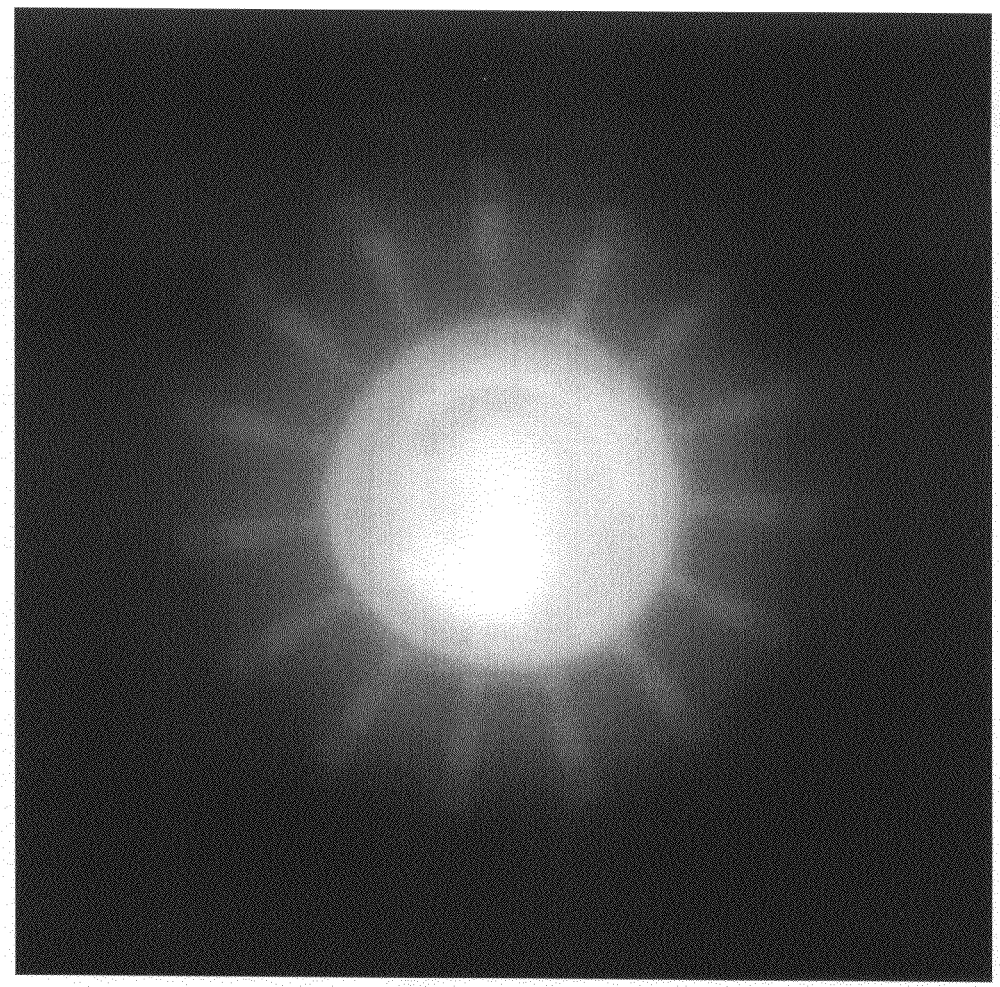
FIG. 6A is a simulated phase-encoded image of the spiral of FIG. 4A encoded using a phase mask designed according to the methods and systems of the present invention.
Figure 6B:
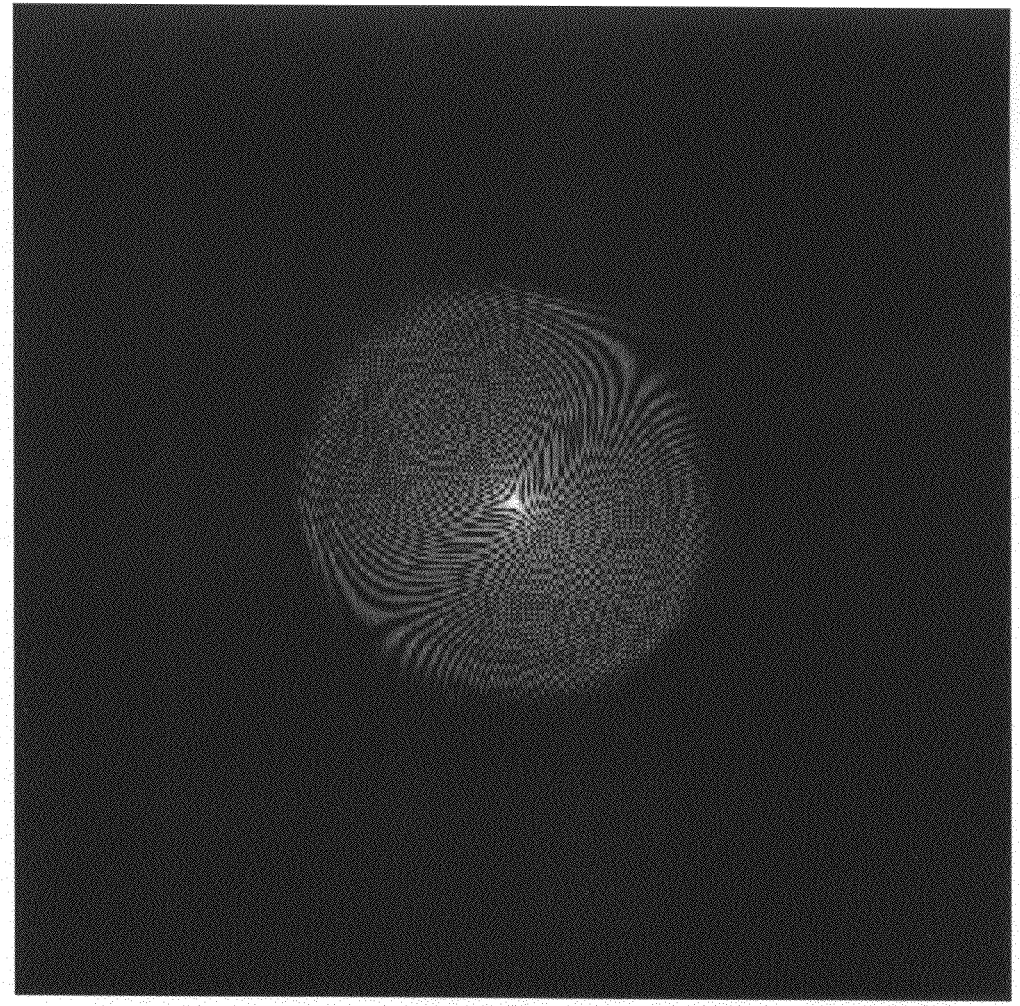
FIG. 6B is a point spread function at zero defocus for the phase mask used to produce the phase-encoded image of FIG. 6A.
Figure 6C:
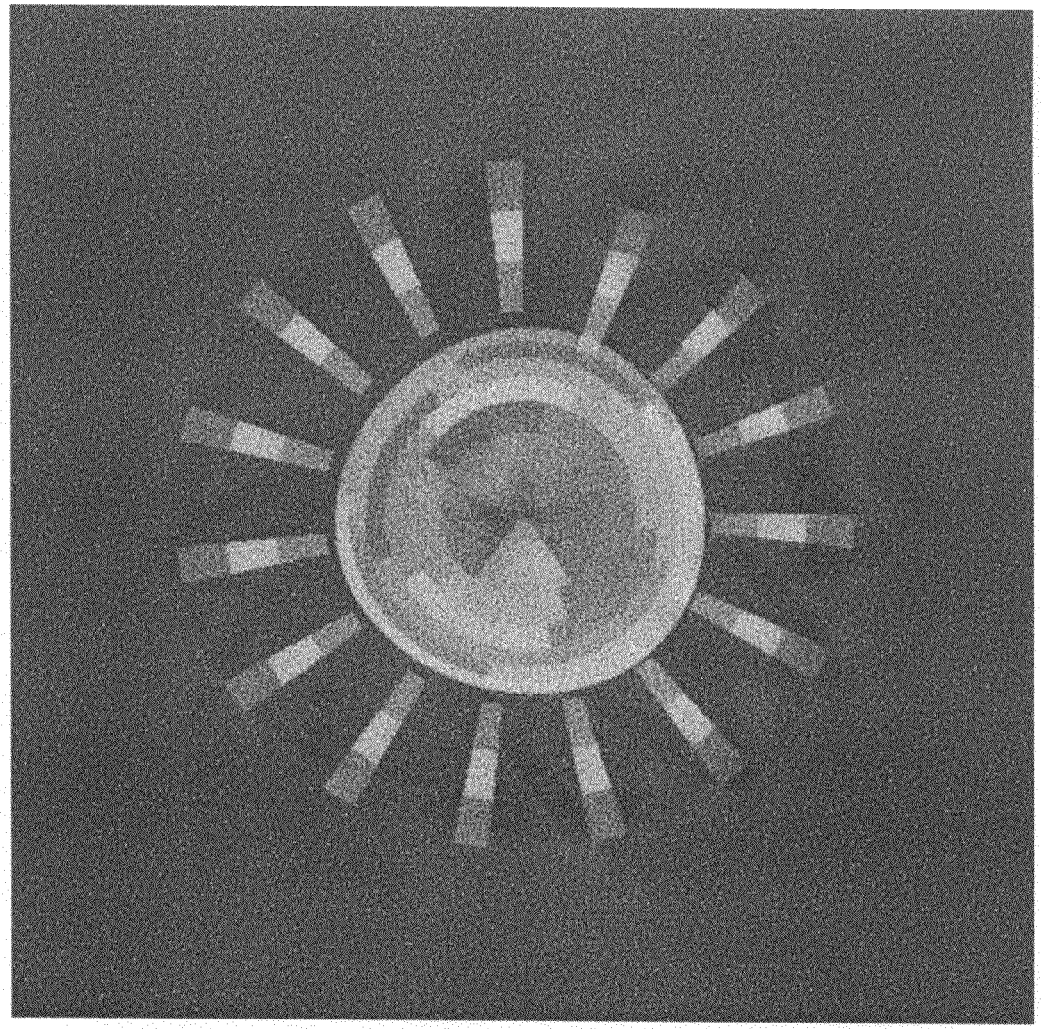
FIG. 6C is a restored image corresponding to the phase-encoded image of FIG. 6A.

A root finding procedure was used to obtain solutions to Equation (20) from a grid of initial approximations about the origin of the a-b plane. A large number of solutions were obtained. FIGS. 6A-6C respectively illustrate the simulated blurred and noisy image (SNR=64), the PSF, and the restored image for one of the particular solutions found. The design parameters computed are a=22.0808 and b=−6.46691. The second and fourth derivatives of the Strehl ratio at δ=0 for these values are $F_2(0)=-2.10866E-7$, and $F_4(0)=2.3603E-6$.

Design Parameters for the Zernike Expansion Phase Mask

A pupil-phase design problem in which the pupil-phase encoding function $\phi z(r, \theta, \delta, \vec{u})$ is given by a linear combination of Zernike polynomials as described by Equation (9) will now be considered. In this example, encoding functions in the space of polynomials spanned by six Zernike polynomials $Z_5, Z_6, \ldots, Z_{10}$ (see Equation (7)) are considered. This set includes all Zernike polynomials of total degree two, and of total degree three, excluding the Zernike polynomial $Z_4$, which represents defocus. Lower degree Zernike polynomials, which correspond to tip, tilt and piston, are also excluded. While pupil-phase functions of higher polynomial degree are of interest, they lead to computationally challenging optimization problems. An example of a pupil phase function of total degree five will be described in detail below.

Instead of a direct root finding approach, the problem can be formulated as a non-linear optimization problem. Referring to Equations (12) and (15), the optimization problem is given by:

$$\hat{u} = \operatorname*{argmin}_{\vec{u}} J_z(\vec{u}), \qquad (21)$$

where $$J_z(\vec{u}) = \sum_{n=1}^{6} \left(F_n(\vec{u})\right)^2 + \gamma \|\vec{u}\|^2 + M\left[1 - \chi(0, \vec{u})\right]\left[1 - \frac{1}{1 + e^{-c(\chi(0, \vec{u}) - \hat{\chi})}}\right] \qquad (22)$$

Here $F_n(\vec{u})$ is given by Equation (12), $\hat{\chi}$ is the minimally acceptable Strehl ratio, and M and c are large positive constants. Both γ and $\hat{\chi}$ may be viewed as regularization parameters. They are chosen heuristically, and a "best" choice is problem dependent.

The objective function $J_z$ is highly oscillatory with numerous local minima. Computational tests with a variety of starting values suggest that there are a very large number of pupil-phase encoding functions that can be used to produce good extended depth of focus results. Local minima of the objective function are found using an implementation of the Levenberg-Marquardt algorithm from the minpack software in Netlib (see www.netlib.org). Numerical evaluation of the non-elementary integrals (see Equation (11)) is performed by an adaptive quadrature routine, as described by A. C. Genz, Washington State University, also available in Netlib.

Figure 7A:
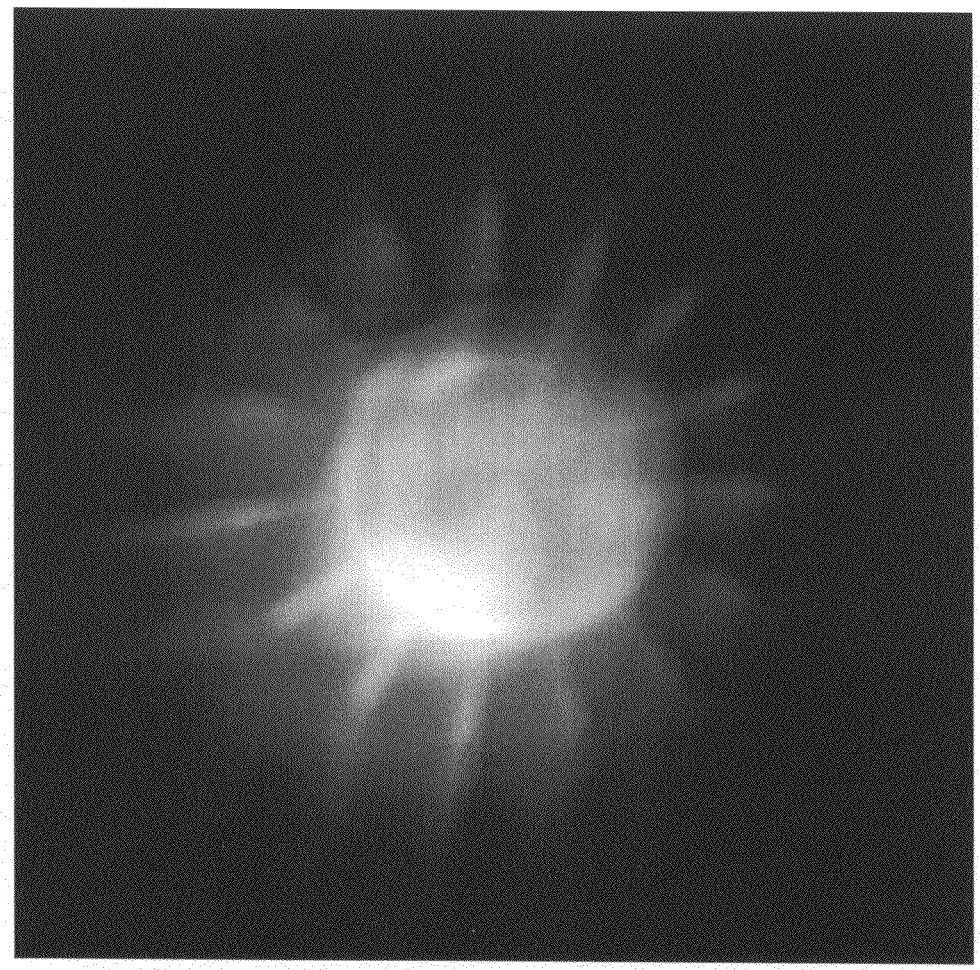
FIG. 7A is a phase-encoded image of the spiral of FIG. 4A that was encoded using a phase mask designed according to the methods and systems of the present invention.
Figure 7B:
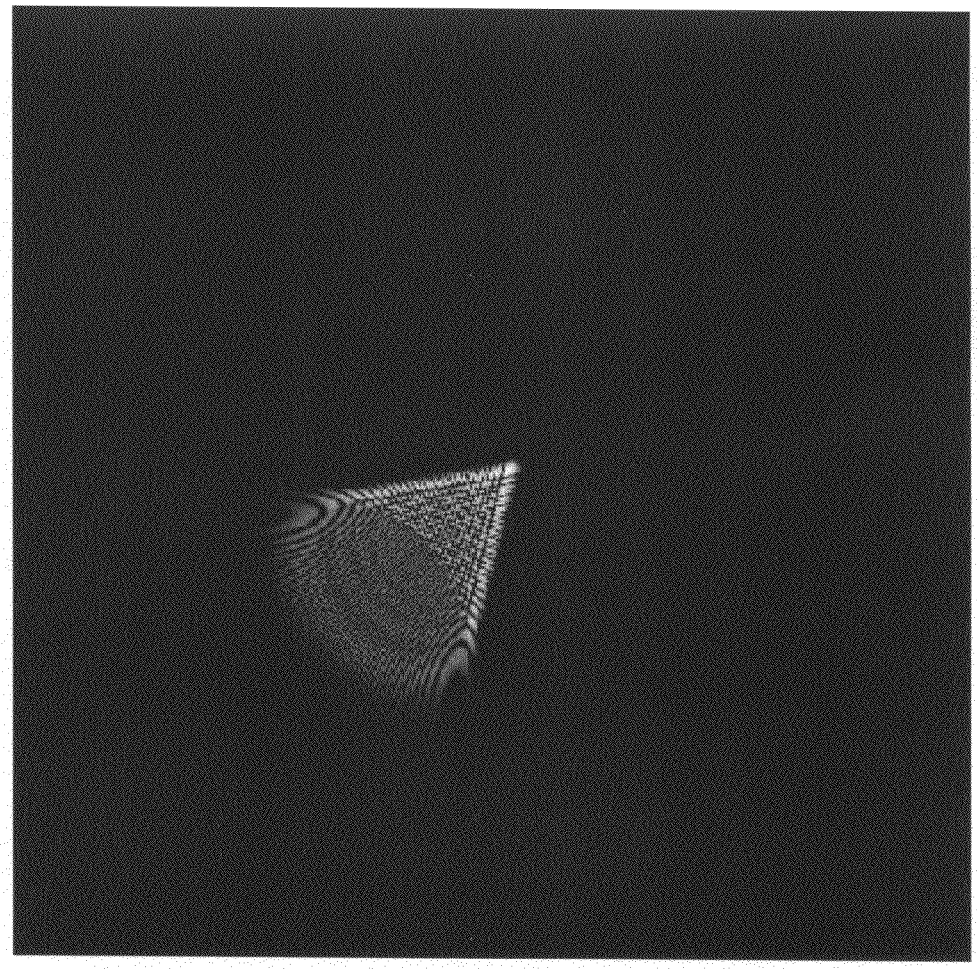
FIG. 7B is a point spread function at zero defocus for the phase mask used to create the phase-encoded image of FIG. 7A.
Figure 7C:
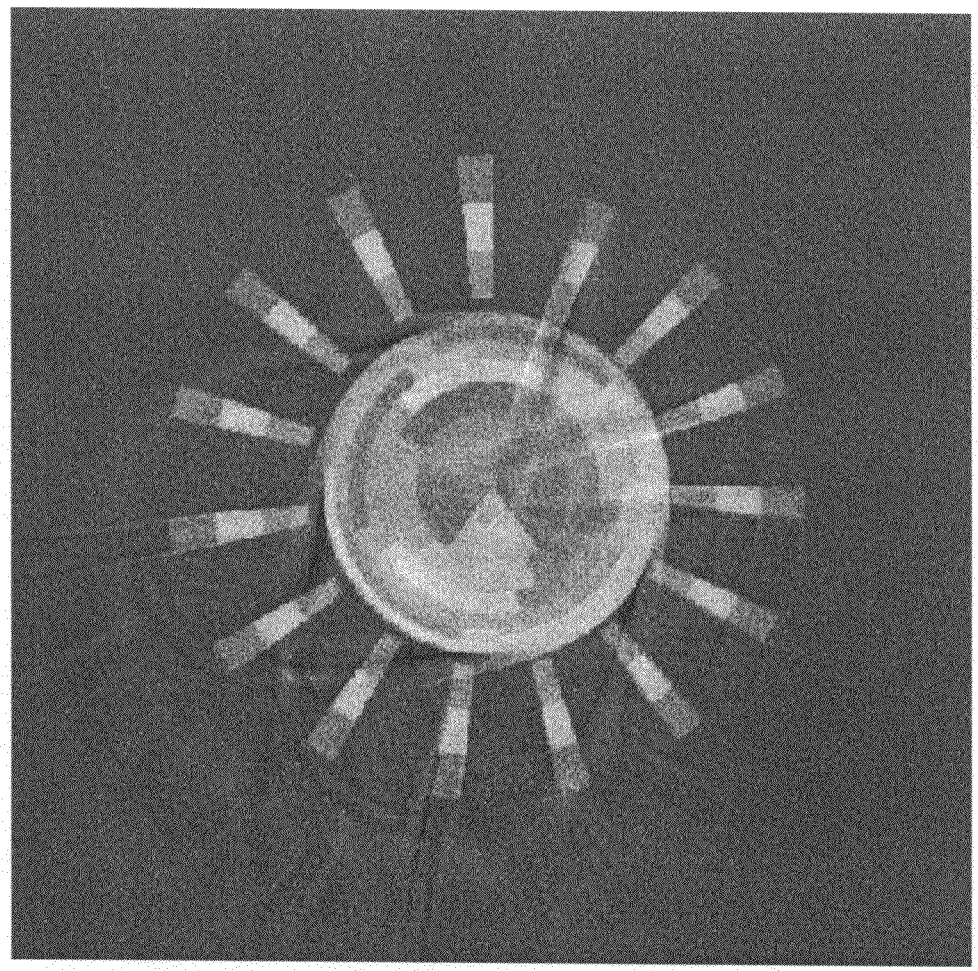
FIG. 7C is a restored image corresponding to the phase-encoded image of FIG. 7A.

Several filters which exhibit distinctively different point spread functions will now be described. The restorations shown in FIGS. 7C, 8C, and 9C correspond to a signal to noise ratio equal to 64. In these examples, signal to noise ratio for an n-pixel image refers to the total signal divided by $n^2\sigma$, where σ is the standard deviation for zero mean, Gaussian noise. FIGS. 7A-7C respectively illustrate a phase-encoded image, the point spread function, and a restored image corresponding to the coefficient vector $\vec{u}_1$ listed below. In FIG. 7A, it can be seen that blur in the image is nearly uniform for all points. In FIG. 7B, the point spread function illustrates that a photon in the original object is likely to spread from the center to the lower left hand quadrant of the image. In FIG. 7C, the arms of the spiral in the restored image are nearly in focus.

The first group of filters, illustrated in FIGS. 7A-7C may fairly be called "cubic-like" filters. These point spread functions are typically "L" shaped, similar in appearance to the point spread function for the cubic cubic filter, but rotated and skewed, i.e., the two characteristic "branches" of the PSF are not at an angle of π/2. For the filter shown in FIGS. 7A-7C $$\vec{u}_1 = [-0.007581, 0.1349, -3.707, 3.512, 0.5899, 0.7914]. \qquad (23)$$

The components of the vector $F(\vec{u}_1)$ (see Equations (10), (11), (12), and (13)) are $$F(\vec{u}_1) = [-8.109 \times 10^{-5}, 0.001041, 0.0002009, -0.001792, -0.001120, 0.02940]. \qquad (24)$$

Figure 8A:
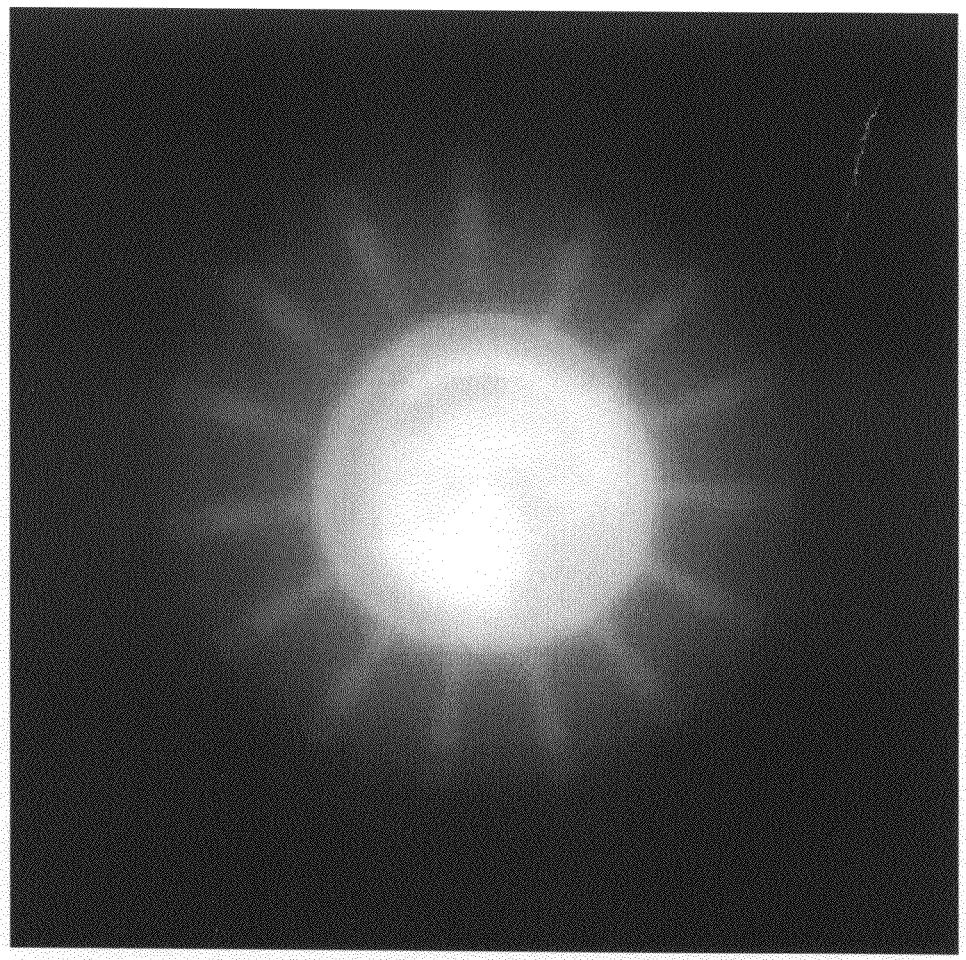
FIG. 8A is a phase-encoded image of the spiral of FIG. 4A produced using a phase mask designed using the methods and systems of the present invention.
Figure 8B:
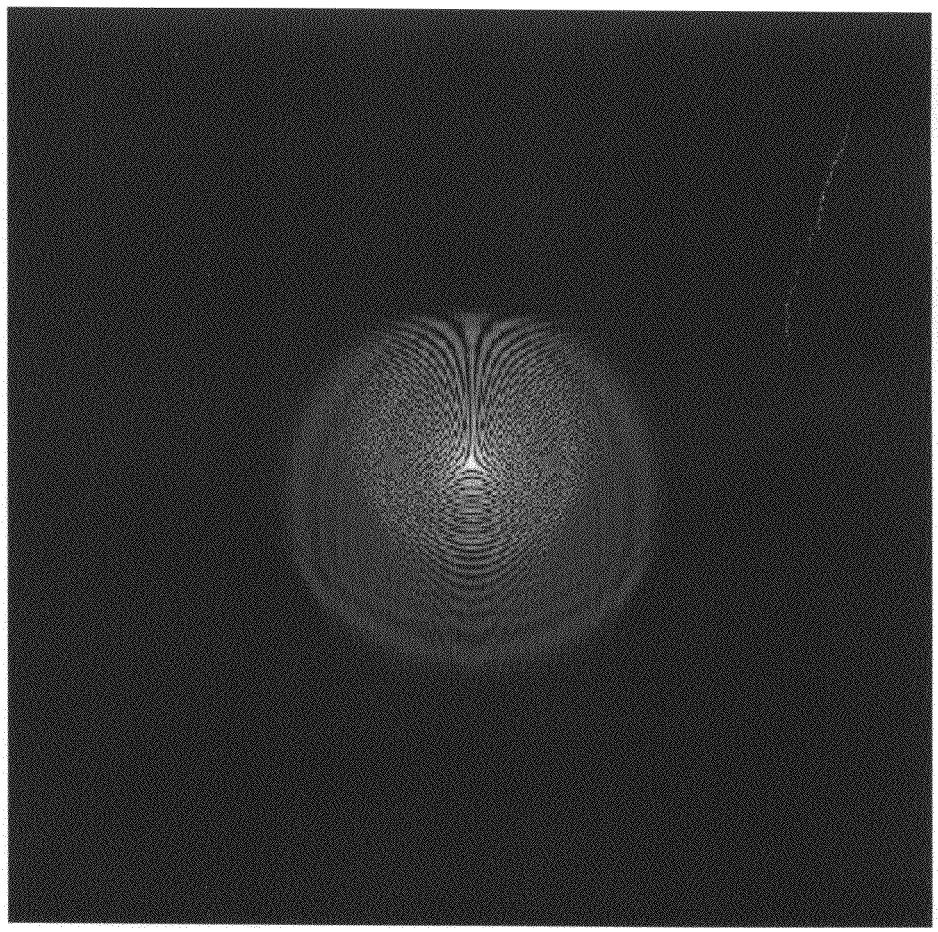
FIG. 8B is a point spread function corresponding to the phase mask at zero defocus for the phase-encoded image of FIG. 8A.
Figure 8C:
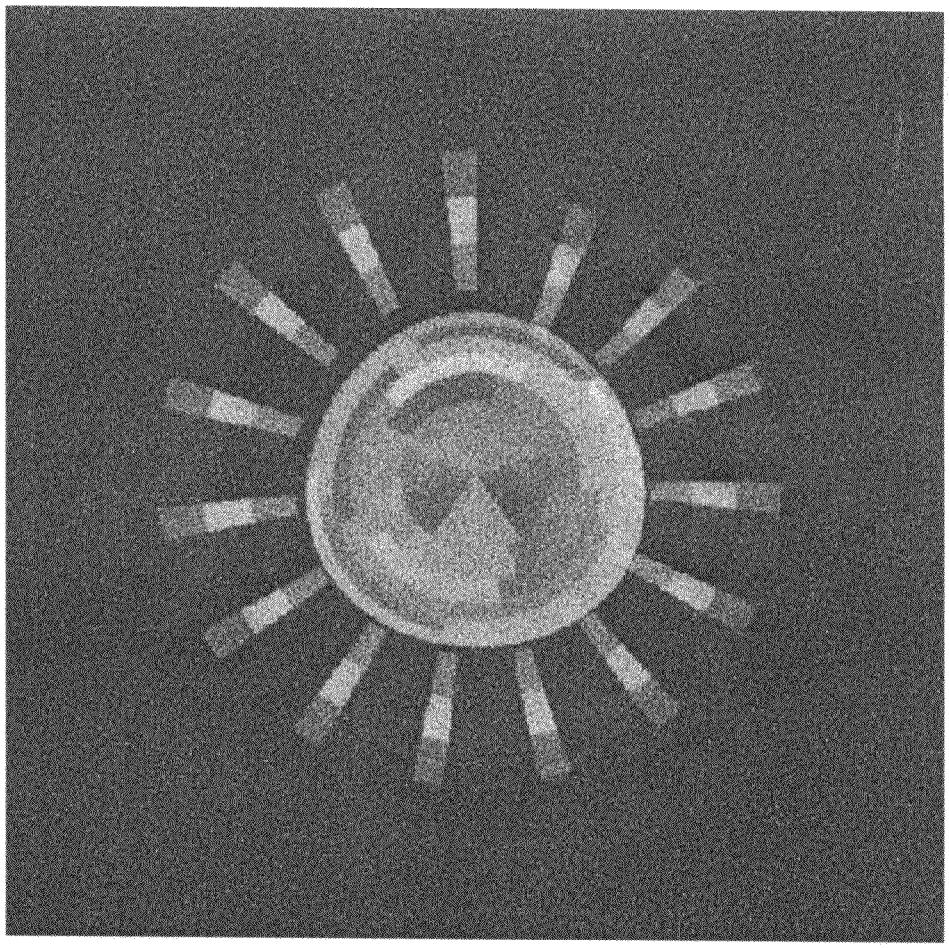
FIG. 8C is a restored image corresponding to the phase-encoded image of FIG. 8A.

A second type of filter is closely related to the Zernike polynomials $Z_6$ and $Z_{10}$. These filters exhibit a characteristic curved triangle shaped PSF. The PSF tends to cluster a significant amount of energy near the peak, and thus tends to produce reasonable restorations in the presence of noise. The effect of the filter on the spatially varying defocus can be clearly seen in the blurred image in FIG. 8A: the "wings" of the object appear blurred in nearly the same manner. Thus, it is reasonable to expect that a spatially invariant restoration method (e.g. regularized Wiener filtering) can produce a restored image with excellent invariance to defocus. A moderate amount of geometric distortion is observed for filters of this type. It should be noted that the standard cubic filter also causes some geometric distortion. FIGS. 8A-8C illustrate one such filter with $$\vec{u}_2 = [0, 8.453, 0, 0, 0, 8.453]. \qquad (25)$$

The components of the vector $F(\vec{u}_2)$ (see Equations (10), (11), (12) and (13)) are $$F(\vec{u}_2) = [-0.00529, 0.00532, 0.00581, -0.0195, 0.00914, 0.303]. \qquad (26)$$

The PSF in FIG. 8B is similar to the PSF shown in FIG. 6B.

A third type of filter, illustrated in FIGS. 9A-9C and 10, has a point spread function distinctly different from either of the filters in FIGS. 7A-7C and 8A-8C. This filter is one of the more interesting filters discovered using the design methodology described herein. It exhibits very good invariance to defocus, low geometric distortion and good restorability as the noise level is increased. The simulation illustrated in FIGS. 9A-9C was computed using an extended region of support to accommodate the extent of the PSF in this example. The resulting extended images were cropped so that they appear in the same scale as the corresponding images in FIGS. 7A-7C and 8A-8C. The filter shown in FIGS. 9A-9C and 10 corresponds to the values $$\vec{u}_3 = [4.070, -2.757, 7.921, -6.459, -7.248, 7.549] \qquad (27)$$

The components of the vector $F(\vec{u}_3)$ (see Equations (10), (11), (12) and (13)) are $$F(\vec{u}_3) = [1.422E-04, -6.070E-04, 9.924E-05, -5.058E-06, 8.704E-06, 6.435E-06]. \qquad (28)$$

Figure 9A:
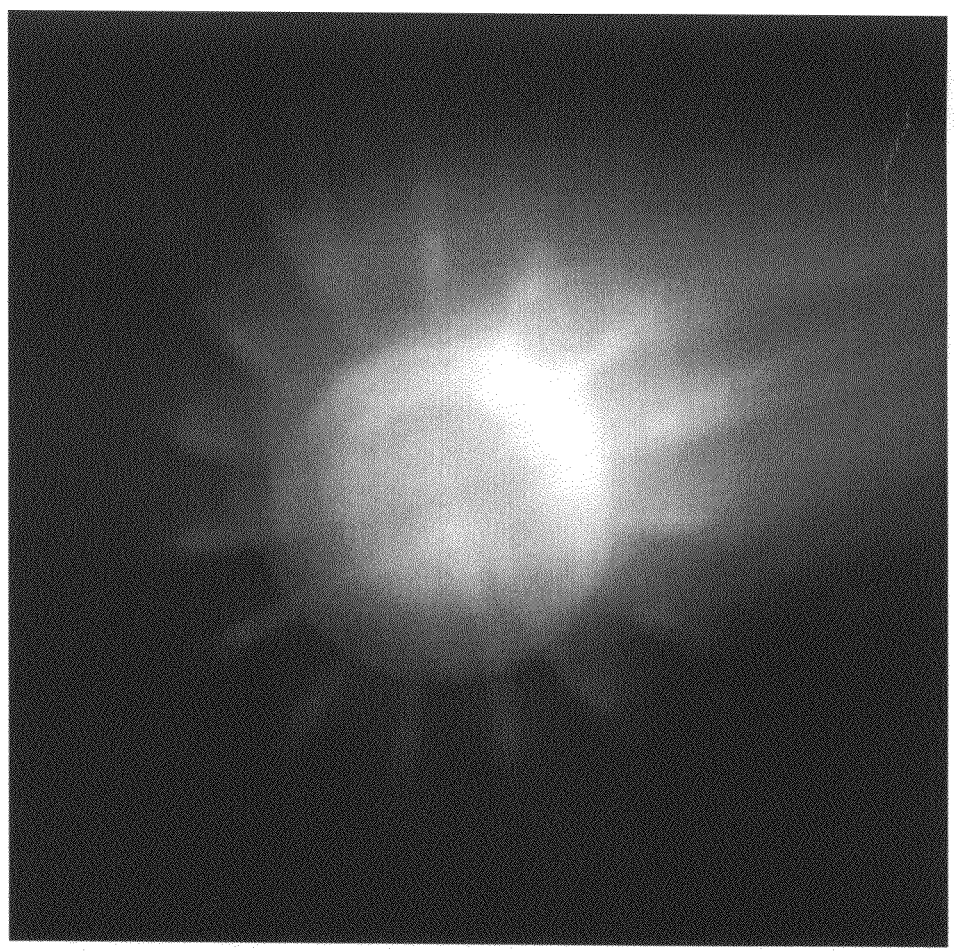
FIG. 9A is a phase-encoded image of the spiral of FIG. 4A produced by a phase mask designed using the methods and systems of the present invention.
Figure 9B:
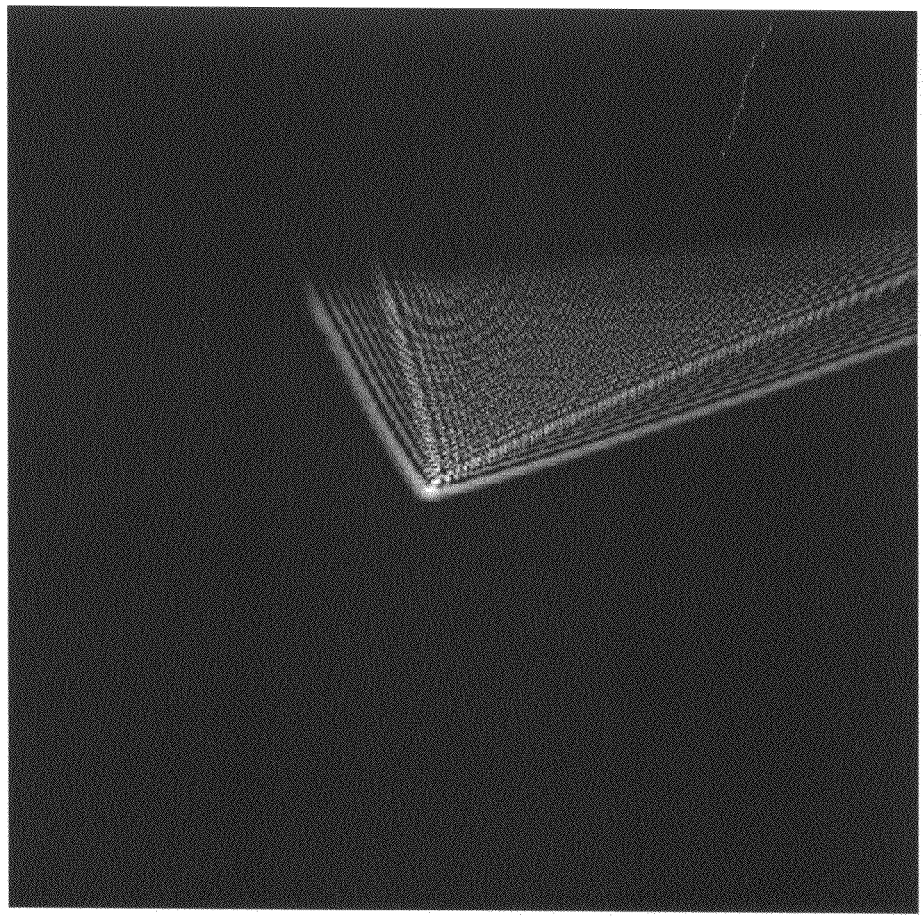
FIG. 9B is a point spread function at zero defocus for the phase mask that produced the phase-encoded image of FIG. 9A.
Figure 9C:
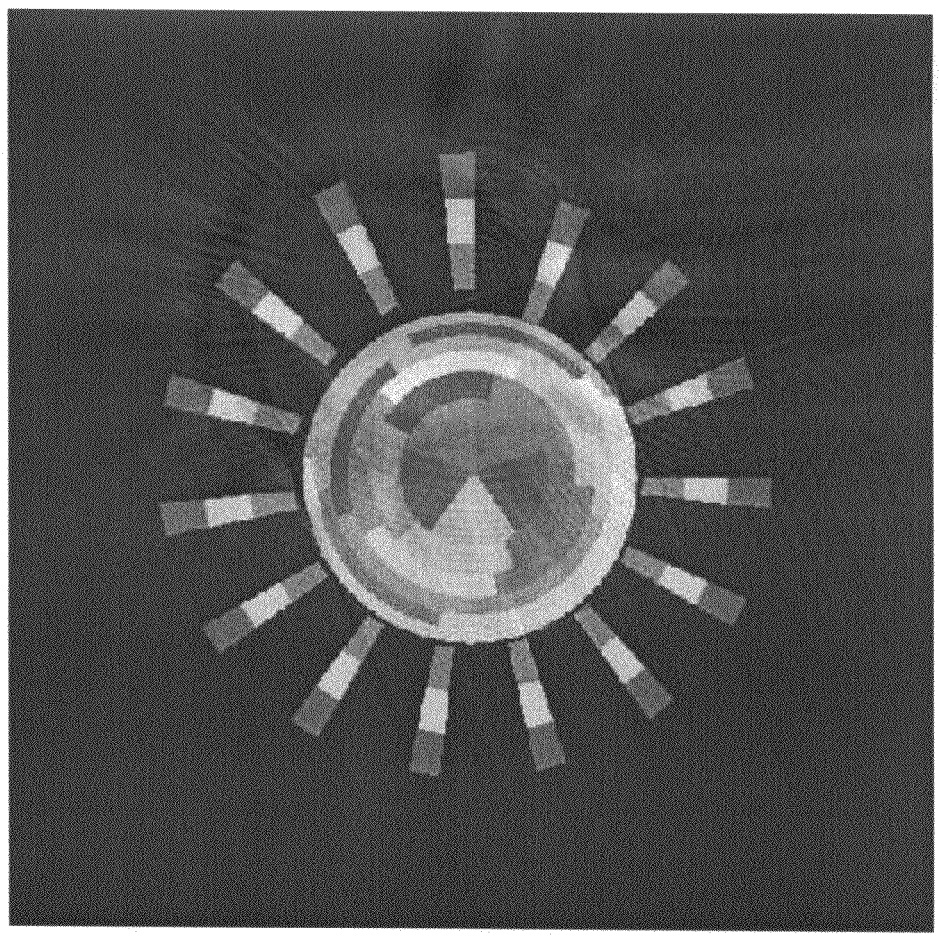
FIG. 9C is a restored image corresponding to the phase-encoded image of FIG. 9A.
Figure 10:
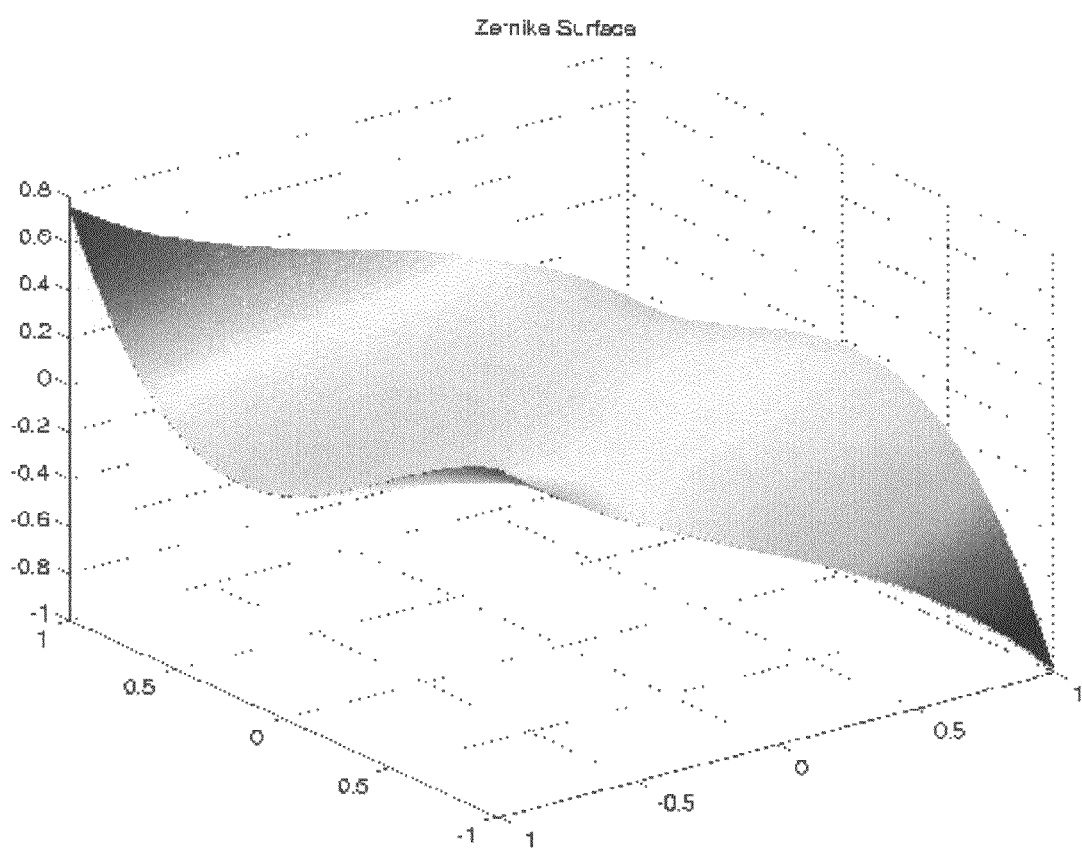
FIG. 10 is a surface plot of the phase mask that produced the phase-encoded image of FIG. 9A.

As illustrated in FIG. 9B, the point spread function for the filter defined by the coefficients of Equation (27) and the polynomial of Equation (9) has a double-v shape. This point spread function is believed to evince a novel filter design regardless of the design method used to create the filter, as point spread functions for cubic masks appear as centralized "blobs." Thus, a phase mask having a double-v point spread function is one aspect of the present invention.

Restoring the Intermediate Image

To date, researchers have emphasized direct linear methods to restore wavefront coded images (Bradburn et al., "Realizations of focus invariance in optical-digital systems with wavefront coding," *Applied Optics*, Vol. 26, pp. 9157-9166, 1997 and Dowski et al., "Extended depth of field through wavefront coding," *Applied Optics*, Vol. 34, pp. 1859-1866, 1995) because of good computational efficiency that allows for real-time restoration. In many applications, real-time results are essential and direct methods are used. In some applications, direct linear methods should be used to identify regions of interest in real-time and more computationally intensive iterative algorithms could be subsequently applied in an attempt to improve restoration fidelity (Nagy et al., "Space-varying restoration of optical images," *J. Optical Soc. Amer. A.*, Vol. 14, pp. 3162-3174, 1997). A preliminary study of iterative restoration of wavefront coded imagery for focus invariance has recently been given in (van der Gracht et al., "Iterative restoration of wavefront coded imagery for focus invariance," in *OSA Trends in Optics and Photonics (TOPS), Integrated Computational Imaging Systems*, OSA Technical Digest, Washington, D.C., 2001). They have found that non-linear iterative methods perform better than linear methods for restoring the intermediate image for cases where the noise level is high. This new image restoration work can be applied to the methods and systems described herein.

Conclusions for Strehl-Ratio-Based Design Methods

In the preceding sections, a multi-parametric optimization technique of engineering an appropriate pupil-phase mask to extend the depth of focus of an imaging system has been presented. The approach has been based on the use of the SR as a most important metric of image quality. Rendering the SR focus insensitive ensures that the phase-encoded, intermediate image—and hence the digitally restored image—is also focus insensitive. Computer simulations of a 3-D nose cone have successfully verified these assertions.

A different class of desirable solutions may consist of those that correspond to modulus transfer functions (MTF) that are not too narrow, so resolution is not degraded greatly while searching for the best focus invariance. This can be implemented by constraining the first few moments of the MTF to be not too small by means of additional penalty terms, and the process corresponds to maximizing the Hopkins ratio (V. N. Mahajan, *Optical Imaging and Aberrations, Part II: Wave Diffraction Optics*, SPIE Press, 2001) instead of the Strehl ratio.

Yet another class of optimal solutions are those that ensure that the MTF itself does not become too small throughout the spatial-frequency range over which the image must be restored. This requirement, well met by the cubic-phase mask and advanced by its proponents as its chief merit, greatly improves the process of digital restoration from the blurred, phase-encoded, intermediate image. In the multi-parametric pupil phase engineering (PPE) approach described herein, this requirement can be implemented.

Use of Symmetric Polynomials to Characterize Phase Masks

In one of the examples described above, Zernike polynomials were used to characterize a phase mask. The Zernike polynomials used to characterize the phase mask were asymmetric, resulting in an asymmetric phase mask. While the results shown above indicate that such asymmetric phase masks effectively reduced spatially-varying blur, there is no known scientific reason to begin the filter design process with asymmetric polynomials because there is no reason to prefer one axis over another axis in the image or pupil plane. In addition, using asymmetric polynomials results in more free parameters and thus increases the time and computation required to determine an optimal solution. Accordingly, in an alternate implementation of the invention, symmetric polynomials may be used to characterize the pupil phase.

The most general polynomial form of the pupil phase $\phi(x, y)$ added by a phase mask can be given by:

$$\phi(x, y) = \sum_{m=1}^{\infty} \sum_{n=1}^{\infty} a_{mn} x^m y^n, \tag{29}$$

from which the constant and linear terms have been ignored since they do not affect image quality. When an x-y symmetric phase is desired, then the number of coefficients is approximately halved. Restricting the phase to be odd under inversion, $\phi(-x, -y) = -\phi(x, y)$, makes the PSF even under inversion in the space of all phase parameters provided only even pupil phase forms are present in the unmodified optical system. Such phase forms include defocus, spherical aberration, astigmatism and curvature. Such an evenness of PSF is very desirable, for even functions are less sensitive to changes of their independent variables around zero than odd functions whose power series start with linear powers in those variables, which is a fact of considerable interest for the defocus variable.

In the examples below, both cubic phase forms as well as combinations of cubic and pentic terms in two different truncated phase forms are addressed. The most general, non-separable, symmetric cubic-pentic phase form, $$\phi(x,y) = a_1(x^3+y^3) + a_2(x^2 y + xy^2) + a_3(x^5+y^5) + a_4(x^4+xy^4) + a_5(x^3 y^2 + x^2 y^3), \tag{30}$$

is optimized via a Fisher information (FI) metric for the defocus-extension problem, while the following two phase forms are used to control spherical aberration:

$$\phi(x,y) = a(x^3+y^3) + b(x^2 y + xy^2) \tag{31}$$

$$\phi(x,y) = a(x^3+y^3) + b(x^5+y^5) \tag{32}$$

Any global optimization over the first of these forms requires exploring a 5 dimensional parameter space, which is considerably more computer intensive than over the latter two forms that have only two independent parameters. A useful optimization strategy that greatly improves computational speed is to explore only those parameter values that are near the surface of a search hypercube, rather than throughout its full volume. This is justified since even a more exhaustive search strategy inevitably produces optimum parameter values that lie near the surface of such a hypercube as such parameter values correspond to phases that most effectively counter the dependence of the PSF on variables like defocus.

The PSF $h(r_i)$ in the image plane [coordinate vector: $r_i = (x_i, y_i)$] is the squared modulus of the amplitude PSF K, $$h(r_1) = |K(r_1)|^2, \tag{33}$$

where K is the following pupil integral involving the total pupil phase, [φ(r)+θ(r)]:

$$K(r_i) = \frac{1}{\lambda f \sqrt{A}} \int dx dy P(r) e^{i\left[\frac{2\pi}{\lambda f} r_i \cdot r + \phi(r) + \theta(r)\right]}. \quad (34)$$

In this expression, P(r) is the pupil function, equal to 1 inside the pupil and 0 outside for a clear pupil, $r_i \cdot r$ denotes the dot product of vectors $r_i$ and r, λ is the wavelength of illuminating light, f is the focal length, and A is the area of the pupil. The pupil vector r has the coordinates x, y. For the pure defocus problem, the uncompensated pupil phase θ(x,y) is simply of form $\tau(x^2+y^2)$.

Fisher-Information-Based Optimization Methods

As described above, one possible optimization function suitable for designing phase masks in accordance with the invention is based on Fisher information (FI). In this section results for the FI-based optimization metric are presented. Fisher information is ideally suited to address the problem of extending the depth of focus, as noted above.

Fisher information measures the sensitivity of the PSF to defocus, and may be defined as (See H. Van Trees, *Detection, Estimation, and Modulation Theory*, Wiley, 1968)

$$J_I(\tau) = \int h(r_i; \tau) \left[\frac{\partial \ln h(r_i; \tau)}{\partial \tau}\right]^2 d^2 r_i \quad (35)$$

$$= \int \frac{1}{h(r_i; \tau)} \left[\frac{\partial h(r_i; \tau)}{\partial \tau}\right]^2 d^2 r_i.$$

The FI optimization metric is based on the following integral of $[J_I(\tau)]^2$.

$$I(\tau_0) = \int_{-\tau_0}^{\tau_0} [J_I(\tau)]^2 d\tau, \quad (36)$$

where $(-\tau_0, \tau_0)$ denotes the (symmetric) range of defocus parameters of interest for the physical problem at hand. The integral can be numerically treated by approximating it by a sum of the integrand evaluated at a number of equally spaced points over the defocus range.

The following Fermi-Dirac regularization implements the digital restorability constraint that in the optimization the Strehl ratio must not be allowed to drop below a threshold:

$$J_\chi(u) = M(1 - \chi(0, u)) \frac{1}{e^{k[\chi(0,u) - \tilde{\chi}]} + 1} \quad (37)$$

where χ(0, u) is the Strehl ratio at zero defocus, u is the vector of phase-mask coefficients being sought, M is a positive constant representing the maximum penalty, k is a large positive constant that determines the steepness of the "cutoff edge," and $\tilde{\chi}$ represents the minimum acceptable SR. For small SNR, both k and $\tilde{\chi}$ are expected to scale inversely with SNR. The optimization consists of minimizing the sum of the two terms in Equations (36) and (37).

A globally optimal solution to the FI-based minimization problem is sought over the five-parameter space of symmetric cubic-pentic masks represented by Equation (30). A total of 640 random starting points were chosen in the hypercube bounded by $-50 \leq a_1 \leq 50$. The Levenburg-Marquart method was then used to find a minimum local to the given starting point. The resulting optimization computations consumed approximately 1.3 CPU years on a 32-processor SGI Origin 2000 computer.

Computer Modeling and Image Restoration in the Presence of Spatially Varying Defocus A simulation of the image of an object with spatially varying defocus was computed for each of the 640 candidate filters. The results of the simulations were then evaluated based on 1) the degree of insensitivity to defocus and 2) the quality of restorations with respect to artifacts. Filters with these two properties were identified as candidates worthy of further study. One such filter has coefficients given by:

$$a_1 = -21.65, a_2 = 41.91, a_3 = 338.2, a_4 = -318.6, a_5 = 586.6 \quad (38)$$

Figure 11:
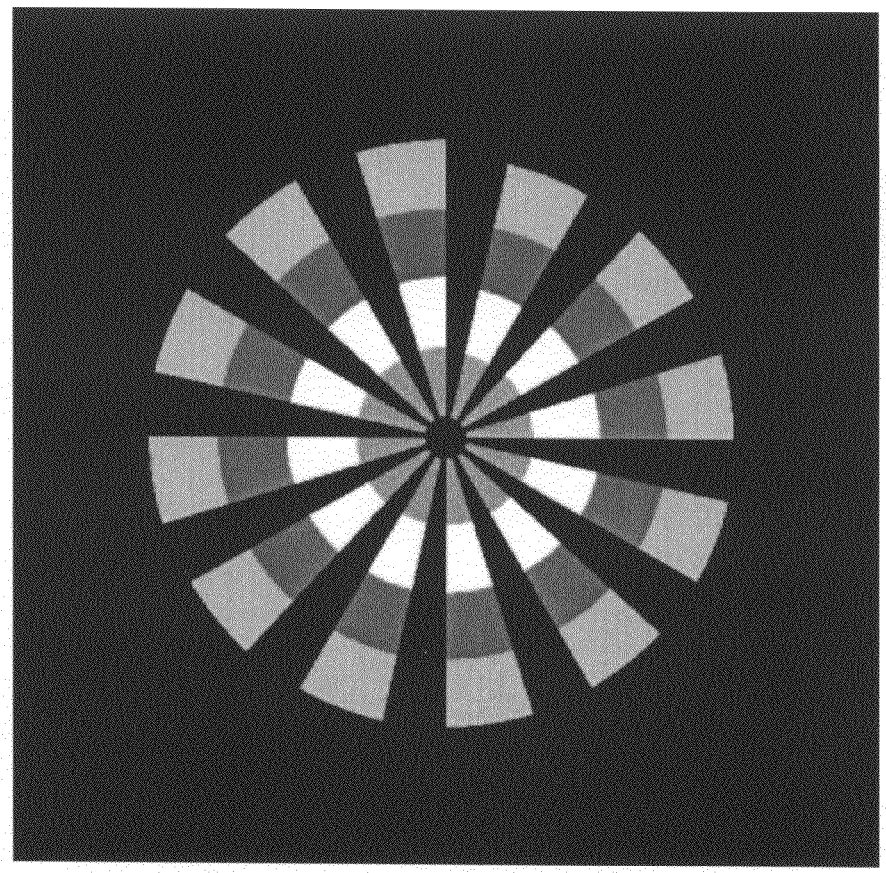
FIG. 11 is a blur-free projection of a sequence of fan blades at progressively increasing depths from the image plane.
Figures 12A, 12B:
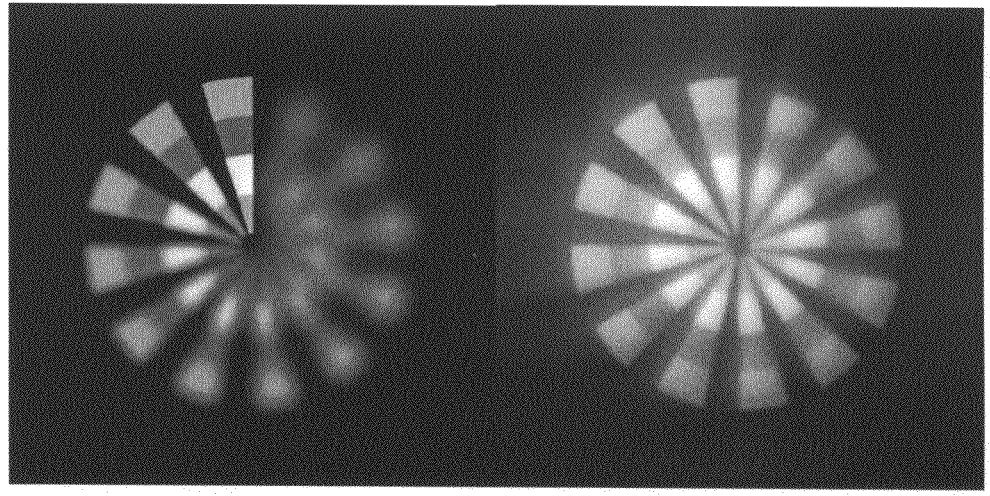
FIG. 12A is a simulated image of the fan of FIG. 11 illustrating spatially varying defocus.
FIG. 12B is a phase-encoded image of the fan of FIG. 11 produced by a phase mask designed using the methods and systems according to the present invention.
Figures 12C, 12D:
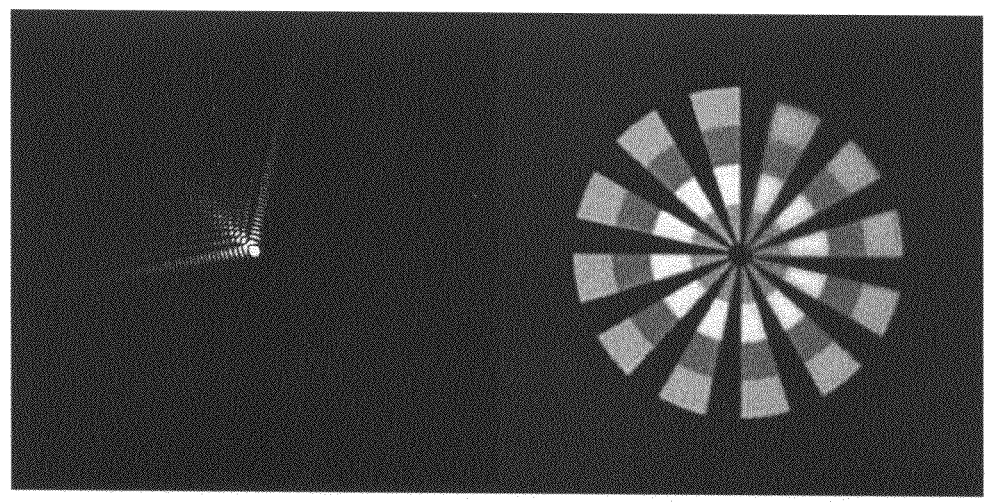
FIG. 12C is a point spread function at zero defocus corresponding to the phase mask that produced the phase-encoded image of FIG. 12B.
FIG. 12D is a restored image corresponding to the phase-encoded image of FIG. 12B.

The filter defined in Equation (30) with the coefficients of Equation (38) is illustrated using a simulated object consisting of a sequence of fan blades which are arranged in a spiral away from the plane of focus, as shown in FIG. 11. FIGS. 12A-12D represent an image formed with no filter (FIG. 12A), an image formed with phase mask filter in Equation (28) (FIG. 12B), a restored image (FIG. 12D), and the filter point spread function (FIG. 12C). The point spread function is shown in a modified log-scale to better illustrate its structure. Two percent (SNR=50) additive zero-mean Gaussian noise is added to each image. The depth-dependent detail in the restored image (FIG. 12D) is much clearer in the restored image than in the image formed without any filter or restoration (FIG. 12A). The restoration can be implemented using simple regularized Wiener filtering. A more powerful conjugate-gradient, least-squares (CGLS) restoration tried on the same phase-encoded noisy image also produced visually similar results.

Figure 13:
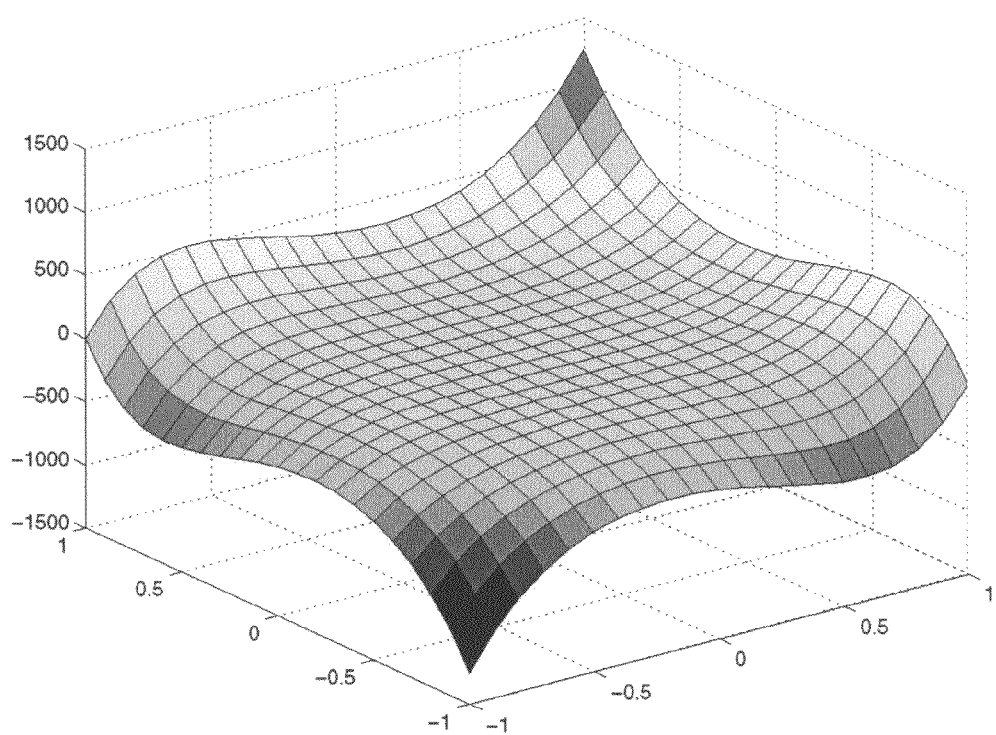
FIG. 13 is a surface plot for a phase mask designed based on Fisher information according to an embodiment of the present invention.
Figure 14:
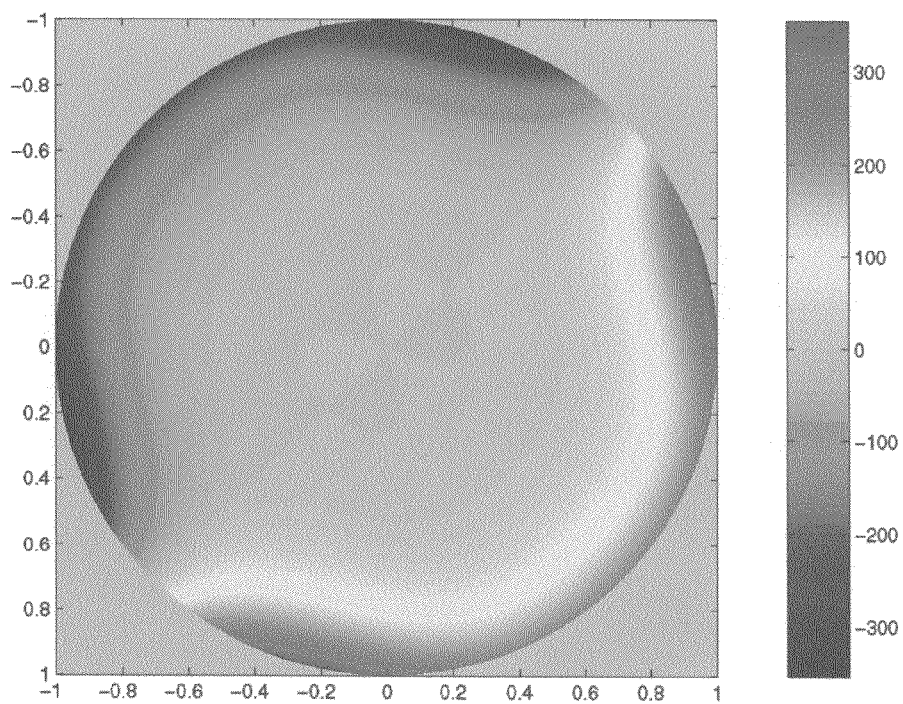
FIG. 14 is a constrained surface plot corresponding to the surface plot of FIG. 13.

FIG. 13 is a surface plot and FIG. 14 is constrained surface plot for the filter represented by Equation (30) with the coefficients of Equation (38). In FIG. 13, the surface represents the phase variation introduced by the filter in the image plane. In FIG. 14, the filter is constrained to a unit circle and each color represents the amount of phase variation introduced by the filter in the image plane. In FIGS. 13 and 14, the horizontal axes represent image or pupil plane coordinates. The vertical axis in FIG. 13 represents the amount of phase variation introduced by the filter in radians. This phase variation can be converted to waves by dividing by 2π. The number of waves of variation can be converted to meters of phase variation by multiplying the number of waves of phase variation by the wavelength of light being filtered. The resulting meters of phase variation and the wavelength can then be used to fabricate a phase mask to achieve the desired phase variation at each point in the image plane.

Comparison with Previously Described Degree-Three Mask

FIGS. 15A-15D compare the quality of restoration obtained using a filter optimized in the polynomial basis of total degree three with a restoration obtained using a filter optimized in the polynomial basis of total degree five. The filter of total degree three used for comparison given by:

$$\phi(x,y) = -102.03(x^2 + xy^2) + 32.68(x^3 + y^3). \quad (39)$$

Like the degree-five mask described above, this mask was also optimized using the same FI metric.

Figure 15A:
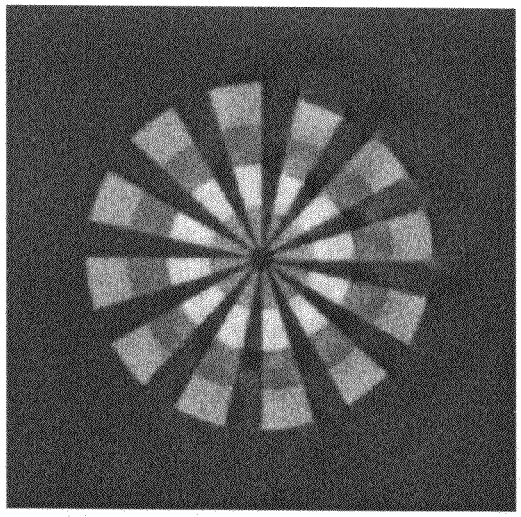
FIG. 15A is a restored image of the fan of FIG. 11 corresponding to a phase mask of total degree three according to an embodiment of the present invention.
Figure 15B:
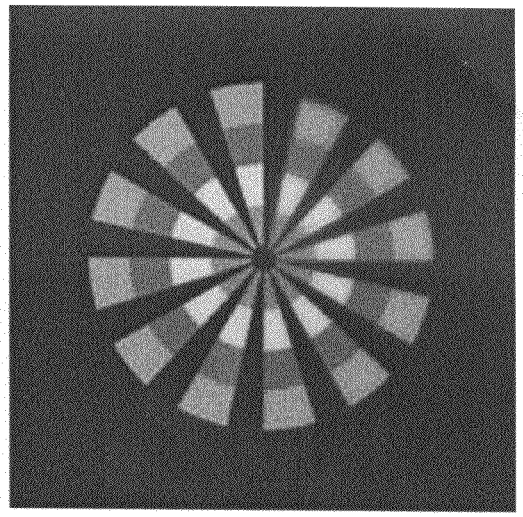
FIG. 15B is a restored image of the fan of FIG. 11 for a phase mask of total degree five according to an embodiment of the present invention.
Figure 15C:
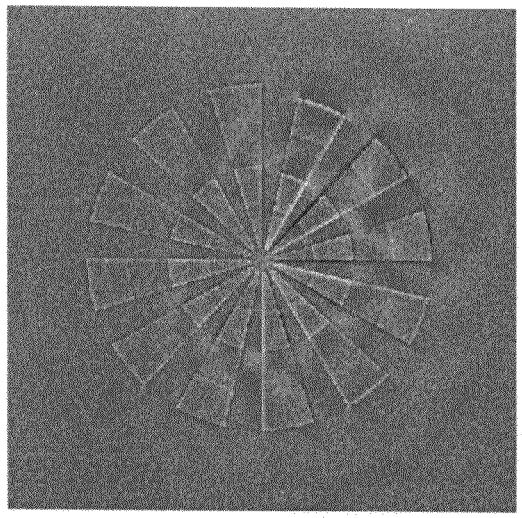
FIG. 15C is a difference image corresponding to FIG. 15A.
Figure 15D:
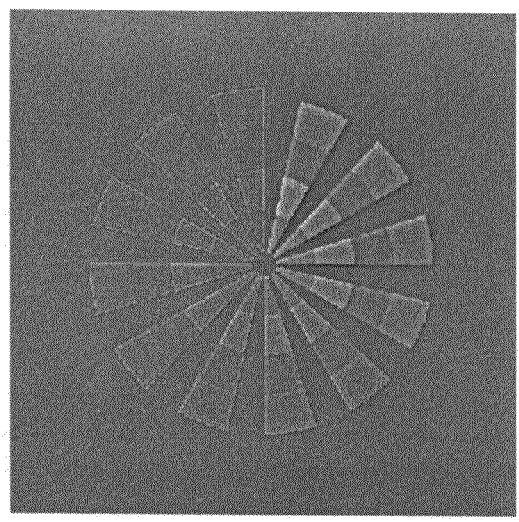
FIG. 15D is a difference image corresponding to FIG. 15B.

A comparison is made by computing the difference between the restored image and the blur-free image, for the same value of SNR, namely 50, used in the images simulated here. FIG. 15A illustrates a restored image created from an image filtered using the degree three mask, and FIG. 15B illustrates a restored image created from an image filtered using the degree five mask. FIG. 15C illustrates the difference image corresponding to an optimized filter of total degree three, and FIG. 15D illustrates the difference image corresponding to an optimized filter of total degree five. The relative errors are 0.3252 (FIG. 15C) and 0.2477 (FIG. 15D) for the given filters of total degree three and five, respectively. In this example, relative error is the 2-norm of the difference image divided by the 2-norm of the blur-free image. When the noise is eliminated altogether, i.e., the SNR is set in effect to ∞(apart from a 64-bit machine-precision related noise of simulation), the relative errors of restoration for the two filters are somewhat closer at 0.2575 and 0.2034, respectively. While these examples do not represent an exhaustive study, they are an indication that the degree-five terms allow for better extended depth of focus, in the sense that relative error is smaller for the optimized filter of total degree five.

Pupil Phase Engineering (PPE) Based Control of Optical System Aberrations

Having demonstrated the efficacy of an engineered pupil phase in extending the depth of focus, a similar approach can be employed to control monochromatic aberrations of the imaging system as well. Such aberrations correspond to pupil phases that depend both on the pupil coordinate vector r and the object coordinate vector $r_o$. For a centered circularly symmetric pupil, the pupil phase for the lowest-order Seidel aberrations takes the form (see V. N. Mahajan, Aberration Theory Made Simple, SPIE Tutorial Text TT106, 1993.)

$$\phi(r;r_o)=c_0 r^4+c_1(r_o \cdot r)r^2+c_2(r_o \cdot r)^2+c_3 r_o^2 r^2+c_4 r_o^2 (r_o \cdot r), \quad (40)$$

where the $c_i$ are the coefficients of the spherical aberration (i=0), coma (i=1), astigmatism (i=2), curvature (i=3), and distortion (i=4), and $r^2=(x^2+y^2)$ and $r_o^2=(x_o^2+y_o^2)$ are the squared norms of the pupil and object coordinate vectors, respectively. Because of the object-coordinate dependence of the pupil phase, the PSF of an aberrated optical system is not shift-invariant, and the image of a transversely extended object is not uniformly resolved over the full image plane. Aberrations therefore restrict the off-axis extension of well-resolved images. Pupil phase masks can once again be employed to control these aberrations and thus extend the off-axis range of imagable distances.

By contrast with the other phase terms in Equation (40), the spherical-aberration phase is not object dependent, and thus does not affect the relative quality of off-axis vs. on-axis imaging. It does, however, lower the effective resolution of the overall image by forcing the larger-angle oblique rays to reach focus at a different distance from the focus of the smaller-angle rays that leave the same object point. Pupil-phase engineering provides a convenient approach for lifting the spherical-aberration MTF off the noise floor, so post-processing can rather effectively deblur the phase encoded image to yield a final image that possesses full diffraction-limited resolution. A minimax optimization procedure that directly controls the restorability of phase-encoded images is the more powerful of the two optimization methods for this purpose. In the following example, PPE is used to control spherical aberration alone. PPE may also be used to recoup the resolution in the presence of field-dependent aberrations.

Spherical Aberration and Pupil-Phase Engineering: Basics

Inexpensive imaging systems are likely to exhibit fabrication-related variations in the coefficients of the different aberrations even when the systems are designed to the same specifications. For such systems, it is important to design a single PPE mask that is well optimized to the full range of variation of the aberration coefficients. Unlike the focus-extension problem, the optimization is aimed here at maximizing restorability, rather than seeking invariance, over such variations of the aberration coefficients.

Since the singular values of a block-circulant-with-circulant-blocks (BCCB) matrix like the shift-invariant PSF are the moduli of its FFT, namely the corresponding MTF values, their sum over all spatial frequencies represents a measure of the invertibility of the associated image deconvolution problem. For this problem the two different two-parameter forms of the phase mask given in Equations (31) and (32) are sought to be optimized. Adding to the PPE phase the spherical-aberration pupil phase $c_0(x^2+y^2)^2$ yields the full pupil phase for each phase mask. If the MTF values corresponding to the full pupil phase are denoted as $\sigma_i(a,b,c_0)$, then the minimax optimization procedure seeks to find $$\min_{a,b} \max_{c_-<c_0<c_+} -\sum_i \sigma_i(a,b,c_0), \quad (41)$$

where $(c_-,c_+)$ is the range of values of the spherical-aberration coefficient $c_0$ for which the optimization of the PPE phase is sought. For a pupil of radius normalized to 1, implicitly assumed in Equation (41), the coefficient $c_0$ represents the spherical-aberration phase at the edge of the pupil.

Spherical Aberration and Pupil-Phase Engineering: Numerical Optimization

In numerical simulations, the lower and upper limits are taken on spherical aberration at the pupil edge to be 2.5 and 10 waves, respectively: $c_-=2.5$, $c_+=10$. For this range of values for $c_0$, the values of a and b for each of the two PPE phase masks were varied over a disk of radius equal to 100 in the a-b plane to determine the optimum values of a and b consistent with the minimax formulation in Equation (41). The minmax optimization was solved numerically using Matlab's fminimax subroutine. For each mask, fminimax was run at 160 starting points over the disk in the a-b plane.

Of the 160 possible solutions found with fminimax for the symmetric cubic form of Equation (31), the most promising phase mask in terms of insensitivity to noise and to spherical aberration is specified by the following coefficients:

a=90.7401, b=6.4175.  (42)

Similarly, of the 160 possible solutions found with fminimax for the separable cubic-pentic phase mask of Equation (31), the most promising phase mask in terms of insensitivity to noise and to spherical aberration is specified by the following coefficients:

a=91.0336, b=78.1710.  (43)

Restoration of Phase-Encoded Iris Images in the Presence of Spherical Aberration One particular application of interest for the methods and systems described herein is biometrics for personnel identification or verification using computational imaging systems for iris recognition. Computational imaging systems are modern systems that consist of generalized aspheric optics and image processing capability. These systems can be optimized to greatly increase the performance for iris recognition applications above systems consisting solely of traditional optics. (See J. van der Gracht, V. P. Pauca, H. Setty, R. Narayanswamy, R. J. Plemmons, S. Prasad, and T. Torgersen, "Iris recognition with enhanced depth-of-field image acquisition," Proc. SPIE 5358, 2004 and R. Plemmons, M. Horvathiiii, E. Leonhardt, P. Pauca, S. Robinson, H. Setty, T. Torgersen, J. van der Gracht, E. Dowski, R. Narayanswamy, and P. Silveira, "Computational Imaging Systems for Iris Recognition, "Proc. SPIE 5559, 2004.)

In one iris recognition experiment, an ideal iris image at best focus was considered to be at a distance of 0.5 m from the system's pupil plane and with no spherical aberration. The system is modeled as having a focal length of 50 mm with a circular pupil of 7 mm diameter. A blurred iris image was computed numerically using 10 waves of spherical aberration of the pupil edge with two percent (SNR=50) zero-mean white Gaussian noise. The wavelength of incident light was assumed to be 760 nm and the detector pixel size was 7.6 mm. The nominal spherical aberration introduced by a lens at the pupil edge was taken to be 6.5 waves.

Figure 16:
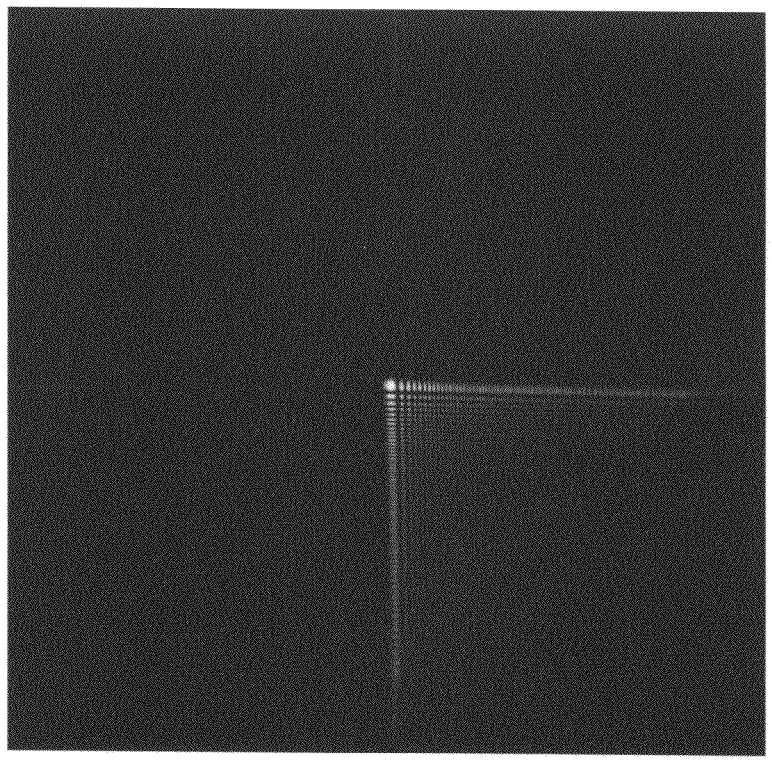
FIG. 16 is a point spread function at zero defocus for a phase-mask design using a min-max function according to an embodiment of the present invention.

The point spread function associated with the symmetric cubic phase mask used in the iris recognition experiment is shown in FIG. 16. The phase mask was used to encode an image of an iris in a system whose lens introduces 10 waves of spherical aberration at the pupil edge, a fabrication-related variation of 3.5 waves over the nominal 6.5 waves. This phase-encoded image of the iris was restored using a CGLS iteration algorithm. The restored image removed a sufficient amount of the spherical aberration to allow iris identification.

Figure 17A:
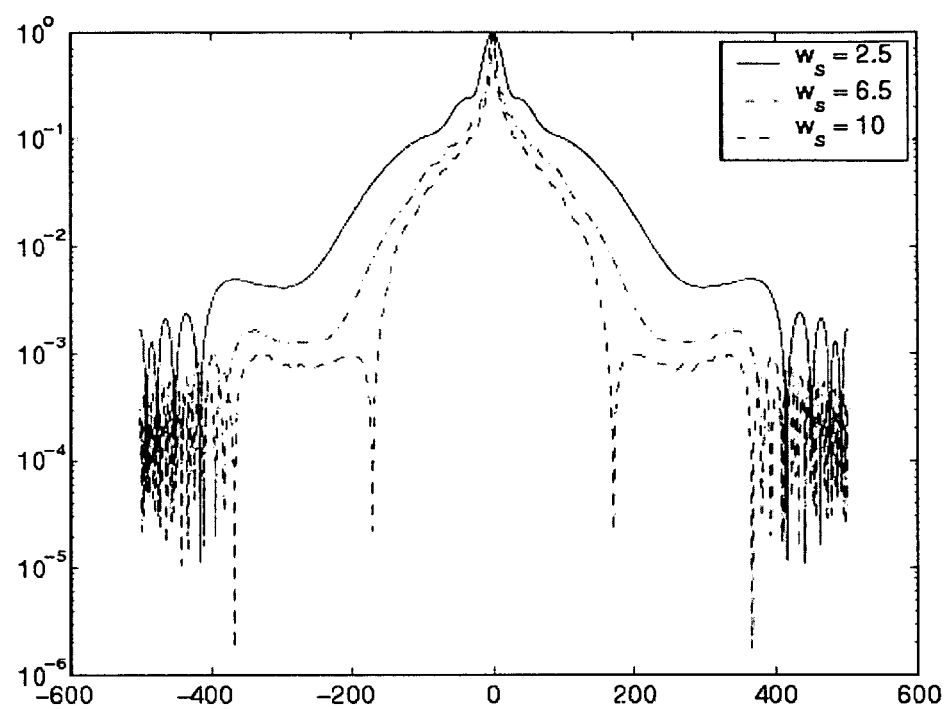
FIG. 17A is a graph of modulation transfer functions of systems with no phase masks and spherical aberration over a desired design range.
Figure 17B:
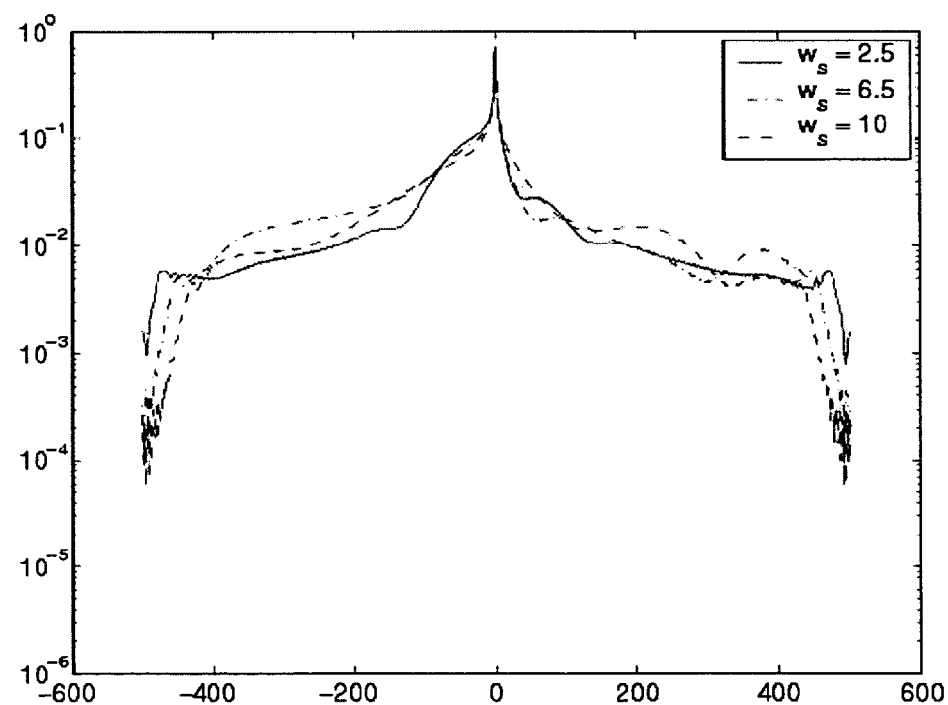
FIG. 17B is a graph illustrating modulation transfer functions of systems with a symmetric cubic phase mask according to an embodiment of the present invention.

As intended, the modulation transfer function (MTF) of systems with no phase mask with spherical aberration over the desired range is lifted significantly over the noise floor by the symmetric cubic phase mask (see FIGS. 17A and 17B. Also, it is important to note that the symmetric cubic phase mask outperforms the one-parameter cubic phase mask (b=0) in that it has a relatively larger range of insensitivity over spherical aberration.

Figure 18:
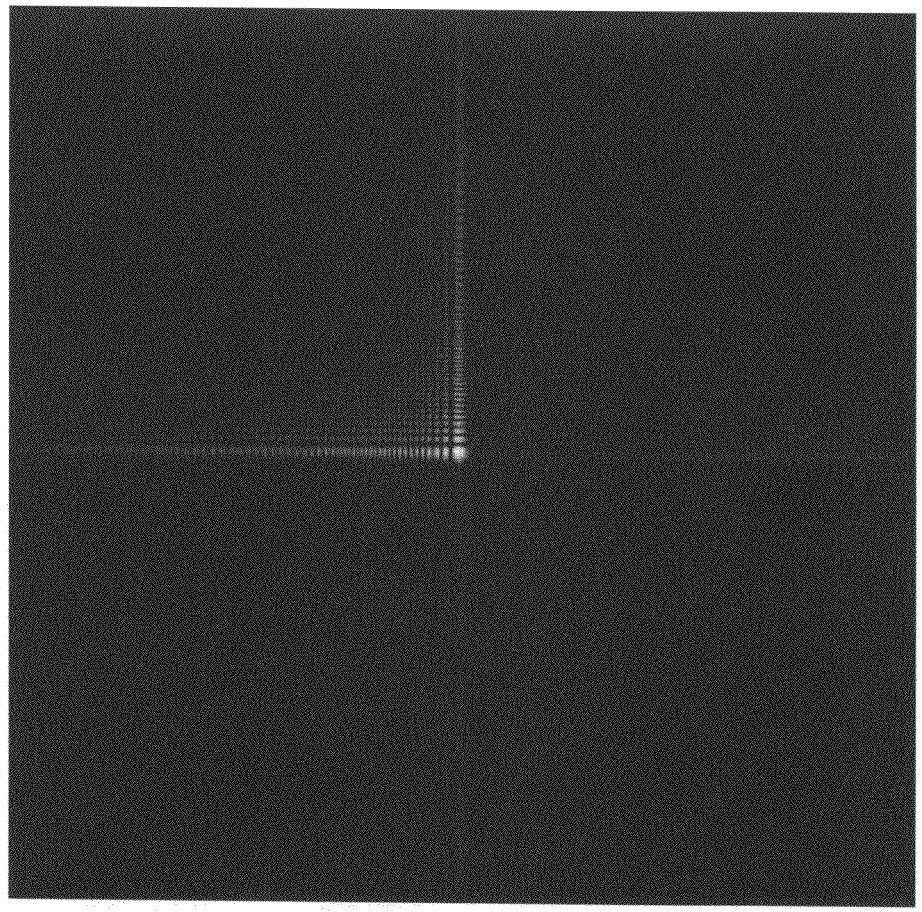
FIG. 18 is a point spread function at zero defocus for a phase mask designed using a min-max function according to an embodiment of the present invention.

The point spread function associated with the separable cubic-pentic phase mask of Equation (32) is shown in FIG. 18. This phase mask was tested by encoding an image of an iris in a system whose lens introduced 10 waves of spherical aberration at the pupil edge, a fabrication-related variation of 3.5 waves over the nominal 6.5 waves. As before, the intermediate image was restored using a CGLS iteration algorithm. The restored image corresponding to the best result from the sequence of iterations produced an even better result than the symmetric cubic phase mask whose PSF is illustrated in FIG. 16.

Figure 19A:
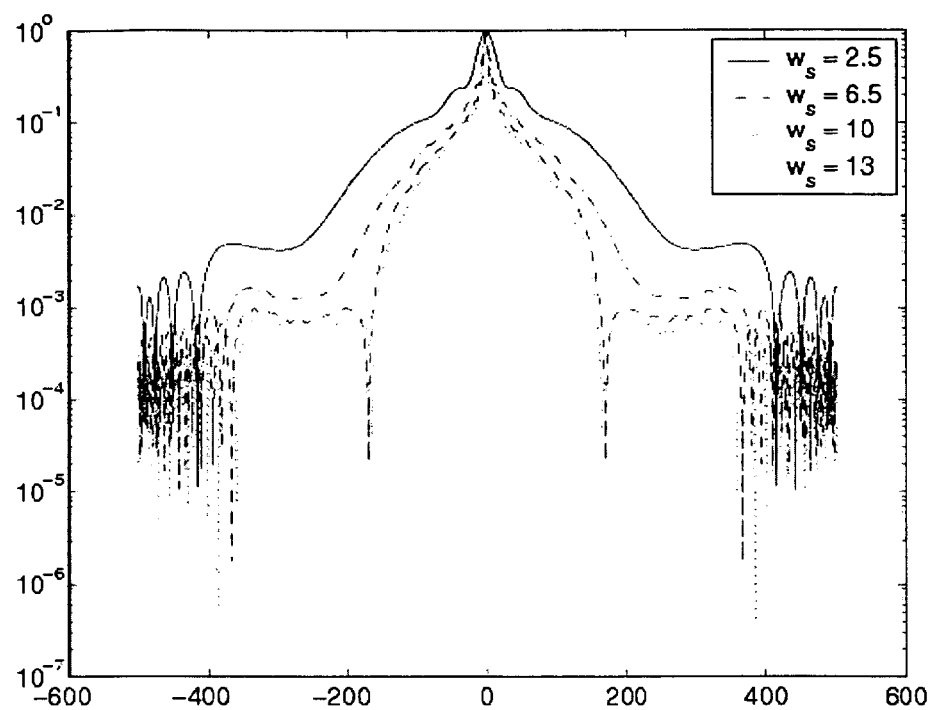
FIG. 19A is a graph illustrating modulation transfer functions of systems with no phase mask with spherical aberration over a desired range.
Figure 19B:
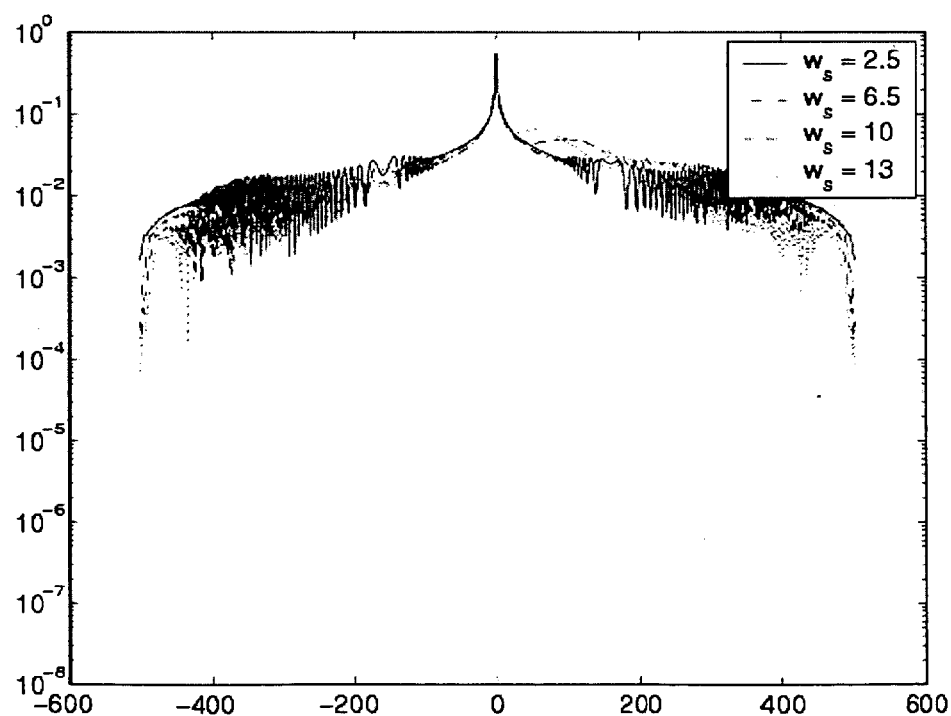
FIG. 19B is a graph illustrating modulation transfer functions of systems with a symmetric cubic and pentic phase mask in place according to an embodiment of the present invention.

FIGS. 19A and 19B illustrate the performance of the mixed cubic-pentic phase mask in terms of lifting of the MTF. The range of insensitivity to spherical aberration is larger for the cubic-pentic phase mask (approximately up to 14 waves) than for the symmetric cubic only. The visual quality (also in terms of iris recognition) of the restored image for the mixed cubic and pentic phase mask is also better than for the symmetric cubic only. These observations are consistent with the expectation that the presence of the higher-order pentic terms in the mask of Equation (32) ought to provide a more effective balancing of the quartic spherical-aberration term over the full pupil than the lower-order cubic terms alone. Indeed, the cubic-pentic mask may be optimal for correcting a quartic aberration, since the latter is tightly "bracketed" by the former in terms of their variation over the full pupil.

Conclusions for FI and Minimax Optimizations

The present work expands the concept of pupil phase engineering to include higher-order phase masks than cubic to show how such phase masks when optimized can further improve the quality of digitally restored images. The Fisher information and minimax optimization metrics have different advantages: The first stresses PSF invariance to the variables being compensated while the second maximizes restorability over the range of those variables.

Two different physical problems where PPE methods are useful were described above. The first is the widely discussed extension-of-focus problem, the addition of optimized fifth-order (x,y) symmetric phase terms to the cubic pupil phase was examined to see how these terms improve the focus insensitivity in the final image. Use was made here of the FI metric, which is better suited than the minimax metric for the focus extension problem because it directly ensures a proper balance between maximum focus invariance and restorability, while the minimax metric does not directly address focus invariance. The second problem is the control of aberrations in poorly corrected optical imaging systems. The case of spherical aberration was discussed at length and numerical results presented for the simulation of an iris image and its restoration under varying strengths of that aberration. The minimax formulation was used here because of its direct emphasis on restorability. Its application yielded optimized 3rd-order and 5th-order symmetric phase masks that led to the restoration of well-resolved iris images, even with 10 waves of spherical aberration at the pupil edge. The 5th-order mask led to visually improved restorations when compared to the 3rd-order mask.

These calculations can be extended to include other Seidel aberrations as well, so that the overall focal-volume extension made possible by these PPE methods can be achieved. Analytical results that provide insight into the fundamental limits on the maximum image quality improvement can also be pursued.

Although the examples described above related primarily to optical imaging systems, the present invention is not limited to designing phase masks or to phase masks for only visible light wavelengths. The methods and systems described herein can be used to design phase masks for any frequency or range of frequencies of electromagnetic radiation desired to be filtered.

Each of the publications referenced herein is hereby expressly incorporated herein by reference in its entirety.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:
1. A method for acquiring an image of a scene in which objects are located at different distances from an image plane, the method comprising:
 (a) collecting electromagnetic waves emanating from or being reflected by objects in a scene located at varying distances from an image plane;
 (b) filtering the electromagnetic waves using a phase mask having a shape being defined by a polynomial with a plurality of terms and a plurality of coefficients selected by computing a derivative of an optical characteristic with respect to misfocus; and (c) restoring the phase encoded image into a viewable or machine-readable image using a predetermined restoration algorithm.

2. The method of claim 1 wherein collecting electromagnetic waves includes collecting electromagnetic waves emanating or being reflected from a human.

3. The method of claim 1 wherein filtering the electromagnetic waves includes filtering the electromagnetic waves using a phase mask defined by a symmetric polynomial.

4. The method of claim 1 wherein filtering the electromagnetic waves includes filtering the electromagnetic waves using a phase mask defined by an asymmetric polynomial.

5. The method of claim 1 wherein restoring the phase-encoded image includes restoring the phase encoded image using a Wiener filter.

6. The method of claim 1 wherein restoring the phase-encoded image includes restoring the phase-encoded image using a conjugate gradient least squares (CGLS) filter.

7. The method of claim 1 wherein the optical characteristic comprises a Strehl ratio.

8. An electromagnetic image acquisition system comprising:

(a) a lens for focusing an image of a scene onto an image plane;

(b) a phase mask optically coupled to the lens for altering the phase of electromagnetic waves emanating from or reflected by the object to produce a phase-encoded image, the phase mask being defined by a polynomial including a plurality of terms and a plurality of coefficients associated with the terms, the coefficients being selected by computing a derivative of an optical characteristic with respect to misfocus; and (c) a restoration filter operatively associated with the phase mask for receiving the phase-encoded image and for producing a restored image of the scene using a predetermined optimization algorithm.

9. The system of claim 8 wherein the phase mask comprises a passive element for producing a desired phase variation in the image plane.

10. The system of claim 8 wherein the phase mask comprises an active element for producing a desired phase variation in the image plane.

11. The system of claim 8 wherein the polynomial is of at least degree three.

12. The system of claim 8 wherein the phase mask is adapted to improve depth at which objects in the scene appear in focus in the image plane.

13. The system of claim 8 wherein the phase mask is adapted to reduce spherical aberrations caused by the lens.

14. The system of claim 8 wherein the optical characteristic comprises a Strehl ratio.

* * * * *